US005772911A

United States Patent [19]
Minor et al.

[11] Patent Number: 5,772,911
[45] Date of Patent: Jun. 30, 1998

[54] 1,1,2,2,3,3,4,4-OCTAFLUOROBUTANE COMPOSITIONS

[75] Inventors: Barbara Haviland Minor; Allen Capron Sievert, both of Elkton, Md.

[73] Assignee: E. I. du Pont de Nemours and Company, Wilmington, Del.

[21] Appl. No.: 852,311

[22] Filed: May 7, 1997

Related U.S. Application Data

[60] Continuation of Ser. No. 486,427, Jun. 7, 1995, abandoned, which is a division of Ser. No. 314,836, Sep. 29, 1994, Pat. No. 5,562,853.

[60] Provisional application No. 60/5,562,853 issued Oct. 8, 1996.

[51] Int. Cl.[6] ................................................. C09K 5/04
[52] U.S. Cl. ............................. 252/67; 62/114; 510/408; 510/411
[58] Field of Search ............................ 252/67; 510/411, 510/408; 62/114

[56] References Cited

U.S. PATENT DOCUMENTS

| 4,663,361 | 5/1987 | Park ........................................... 521/94 |
| 4,789,690 | 12/1988 | Milovanovic-Lerik et al. ....... 521/137 |
| 5,166,182 | 11/1992 | Blanpied .................................. 521/50 |
| 5,194,170 | 3/1993 | Merchant et al. ....................... 252/67 |

FOREIGN PATENT DOCUMENTS

| 0431458 | 6/1991 | European Pat. Off. . |
| 431458 | 6/1991 | European Pat. Off. . |
| 910213896 | 8/1991 | Japan .............................. C07C 19/08 |
| 4-110385 | 4/1992 | Japan . |
| 05051597-A | 3/1993 | Japan . |
| WO9304160 | 4/1993 | Japan .............................. C11D 7/50 |
| 5-186793 | 7/1993 | Japan . |
| 930163425 | 7/1993 | Japan .............................. C11D 7/50 |
| 06306391-A | 11/1994 | Japan . |
| WO 93/08240 | 4/1993 | WIPO .............................. C09K 5/04 |
| WO93/04160 | 4/1993 | WIPO .............................. C11D 7/50 |
| WO 93/10203 | 5/1993 | WIPO . |
| WO 94/17153 | 8/1994 | WIPO . |
| WO 94/25514 | 11/1994 | WIPO . |

Primary Examiner—Christine Skane

[57] ABSTRACT

Compositions include compositions of 1,1,2,2,3,3,4,4-octafluorobutane and a hydrocarbon having from 3 to 7 carbon atoms. Specific examples include 1,1,2,2,3,3,4,4-octafluorobutane and butane, cyclopropane, isobutane, propane, cyclopentane, 2,2-dimethylbutane, n-pentane, 2-methylbutane, cyclohexane, 2,3-dimethylpentane, 3-ethylpentane, heptane, hexane or methylcyclopentane. Also included in this invention are compositions of 1,1,2,2,3,3,4,4-octafluorobutane and ethyl formate, propylene oxide, bis(pentafluoroethyl)sulfide, dimethoxyethane or tetrahydrofuran. These compositions, which may be azeotropic or azeotrope-like, may be used as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents or displacement drying agents.

2 Claims, 19 Drawing Sheets

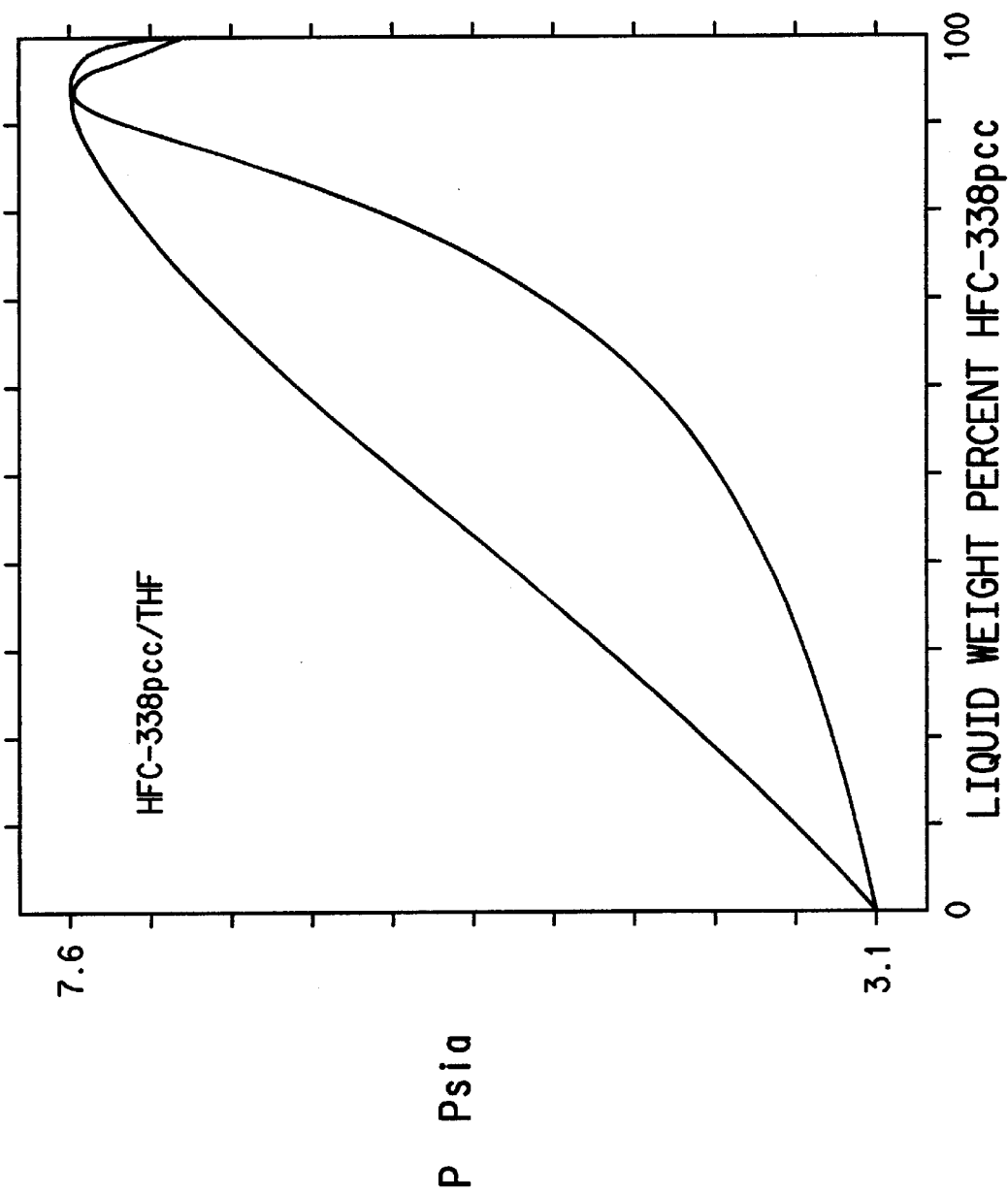

1,1,2,2,3,3,4,4-OCTAFLUOROBUTANE COMPOSITIONS

This is a continuation, of application Ser. No. 08/486,427 filed Jun. 7, 1995, now abandoned, which is a divisional application of Ser. No. 08/314,836 filed Sep. 29, 1994, now U.S. Pat. No. 5,562,853 which issued Oct. 8, 1996.

FIELD OF THE INVENTION

This invention relates to refrigerant compositions that include 1,1,2,2,3,3,4,4-octafluorobutane. These compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include trichlorofluoromethane (CFC-11) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable to use as a refrigerant a single fluorinated hydrocarbon or an azeotropic or azeotrope-like composition that includes a fluorinated hydrocarbon.

Fluorinated hydrocarbons may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosol, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to compositions of 1,1,2,2,3,3,4,4-octafluorobutane (HFC-338pcc) and a hydrocarbon having from 3 to 7 carbon atoms. Specific examples include HFC-338pcc and butane, cyclopropane, isobutane, propane, cyclopentane, 2,2-dimethylbutane, n-pentane, 2-methylbutane, cyclohexane, 2,3-dimethylpentane, 3-ethylpentane, heptane, hexane or methylcyclopentane. Also included in this invention are compositions of HFC-338pcc and ethyl formate, propylene oxide, bis(pentafluoroethyl)sulfide (3110S$\beta\gamma$), dimethoxyethane or tetrahydrofuran (THF). These compositions are also useful as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents. Further, the invention relates to the discovery of binary azeotropic or azeotrope-like compositions comprising effective amounts of HFC-338pcc and a hydrocarbon having from 3 to 7 carbon atoms. Specific examples include HFC-338pcc and butane, cyclopropane, isobutane, propane, cyclopentane, 2,2-dimethylbutane, n-pentane, 2-methylbutane, cyclohexane, 2,3-dimethylpentane, 3-ethylpentane, heptane, hexane or methylcyclopentane. Also included in this invention are compositions of HFC-338pcc and ethyl formate, propylene oxide, 3110S$\beta\gamma$, dimethoxyethane or THF to form an azeotropic or azeotrope-like composition.

BRIEF DESCRIPTION OF THE DRAWINGS

FIG. 19 is a graph of the vapor/liquid equilibrium curve for mixtures of HFC-338pcc and THF at 25° C.

DETAILED DESCRIPTION

Figure 1:
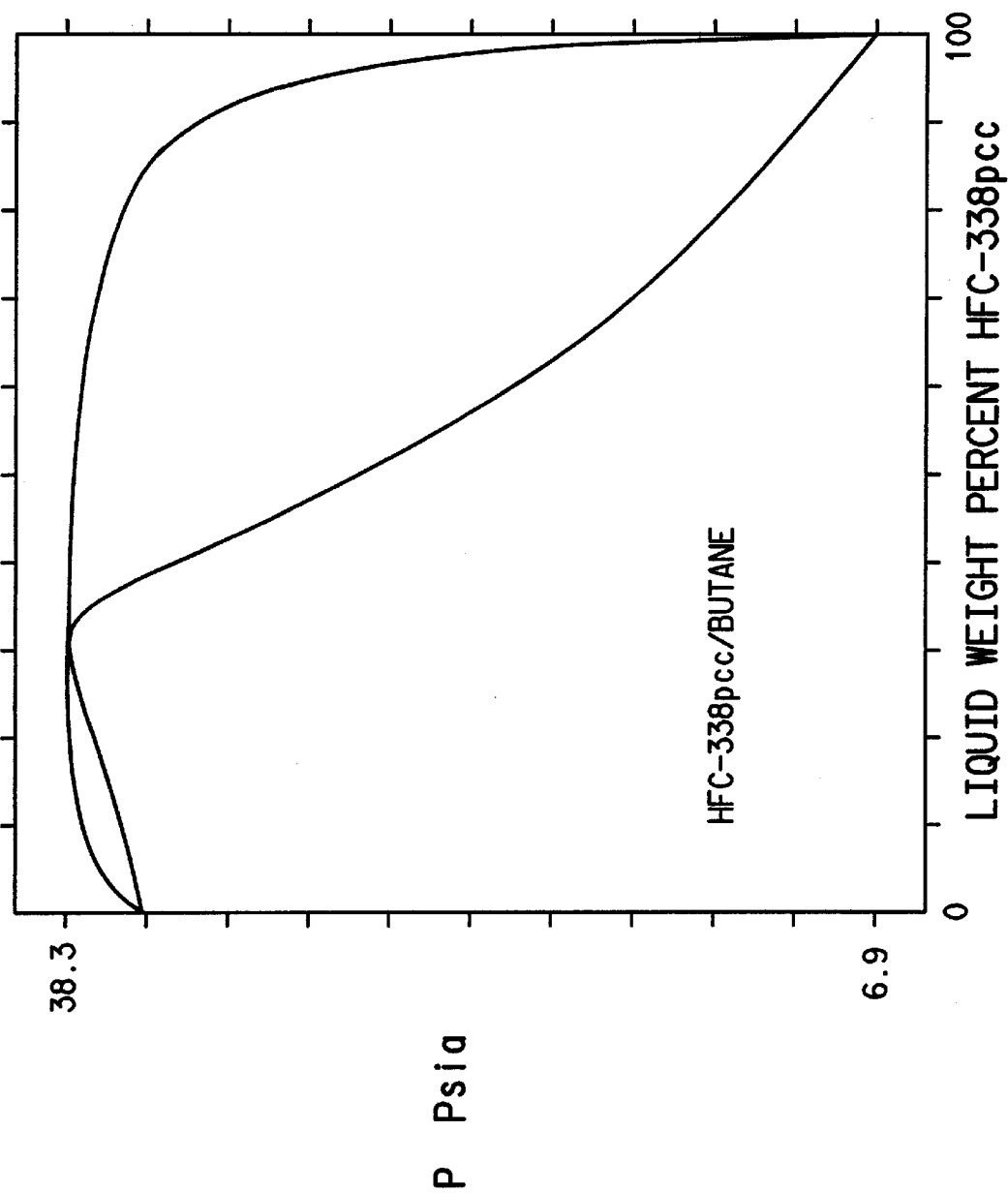
FIG. 1 is a graph of the vapor/liquid equilibrium curve for mixtures of HFC-338pcc and butane at 25° C.
Figure 2:
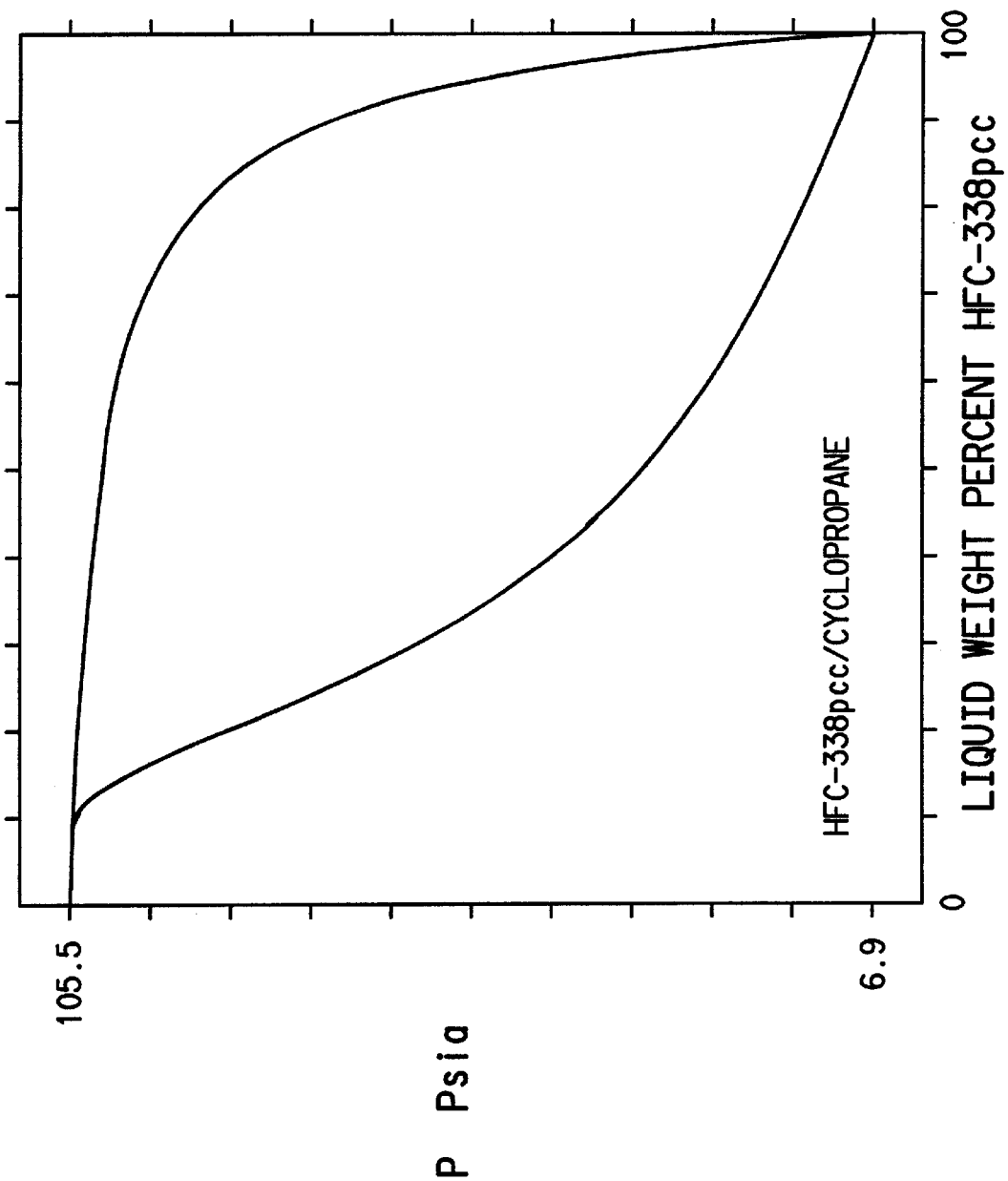
FIG. 2 is a graph of the vapor/liquid equilibrium curve for mixtures of HFC-338pcc and cyclopropane at 25° C.
Figure 3:
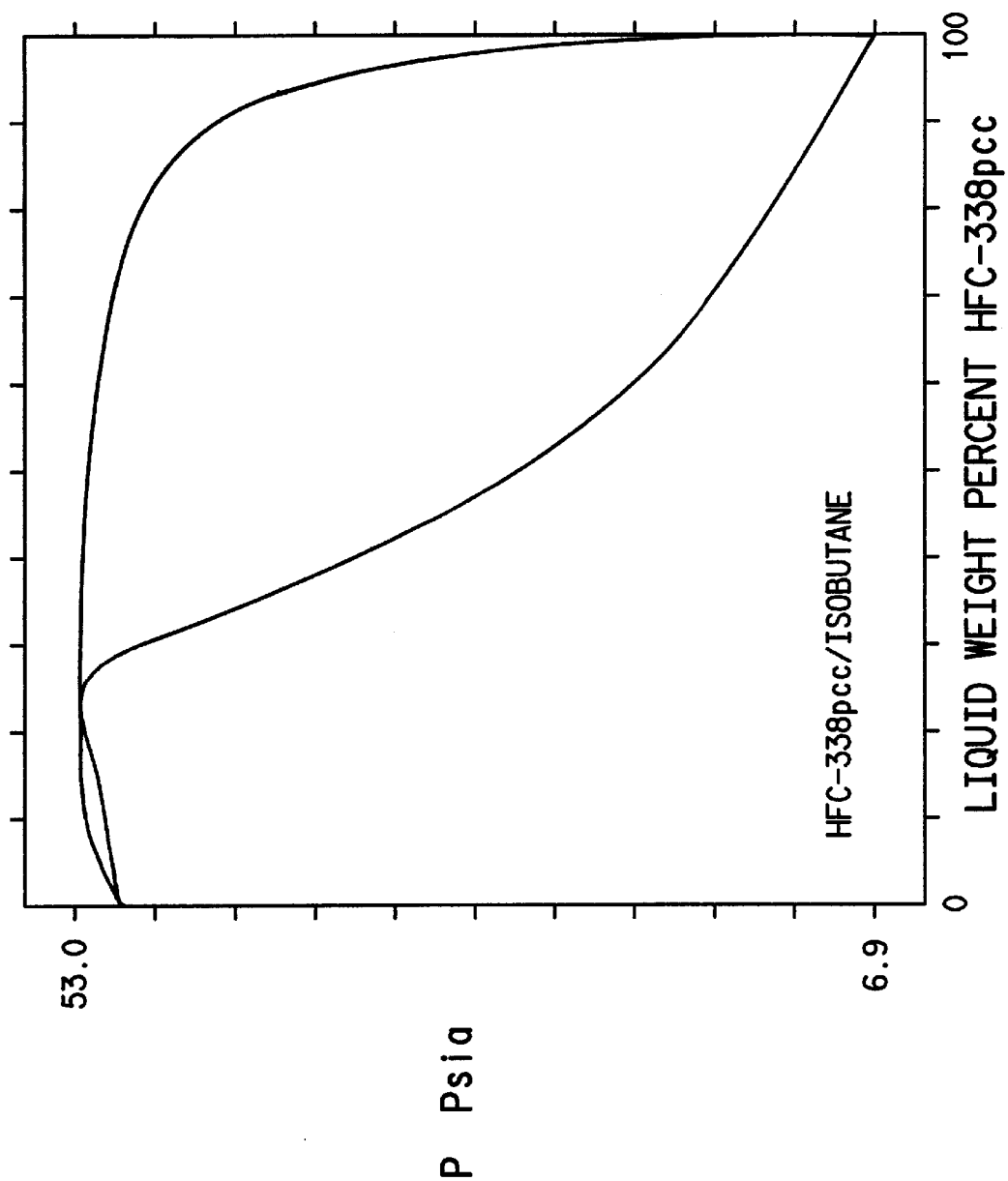
FIG. 3 is a graph of the vapor/liquid equilibrium curve for mixtures of HFC-338pcc and isobutane at 25° C.
Figure 4:
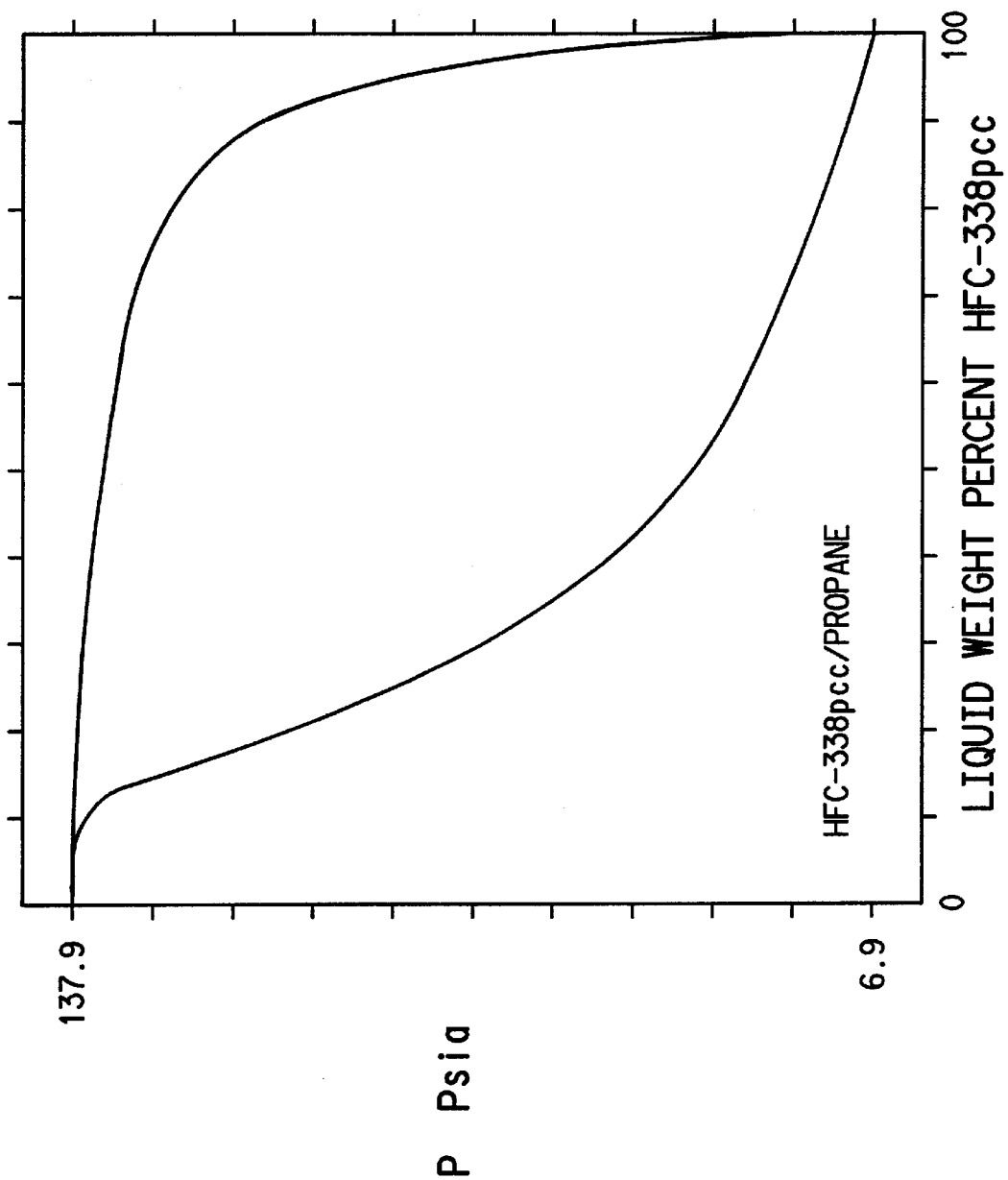
FIG. 4 is a graph of the vapor/liquid equilibrium curve for mixtures of HFC-338pcc and propane at 25° C.
Figure 5:
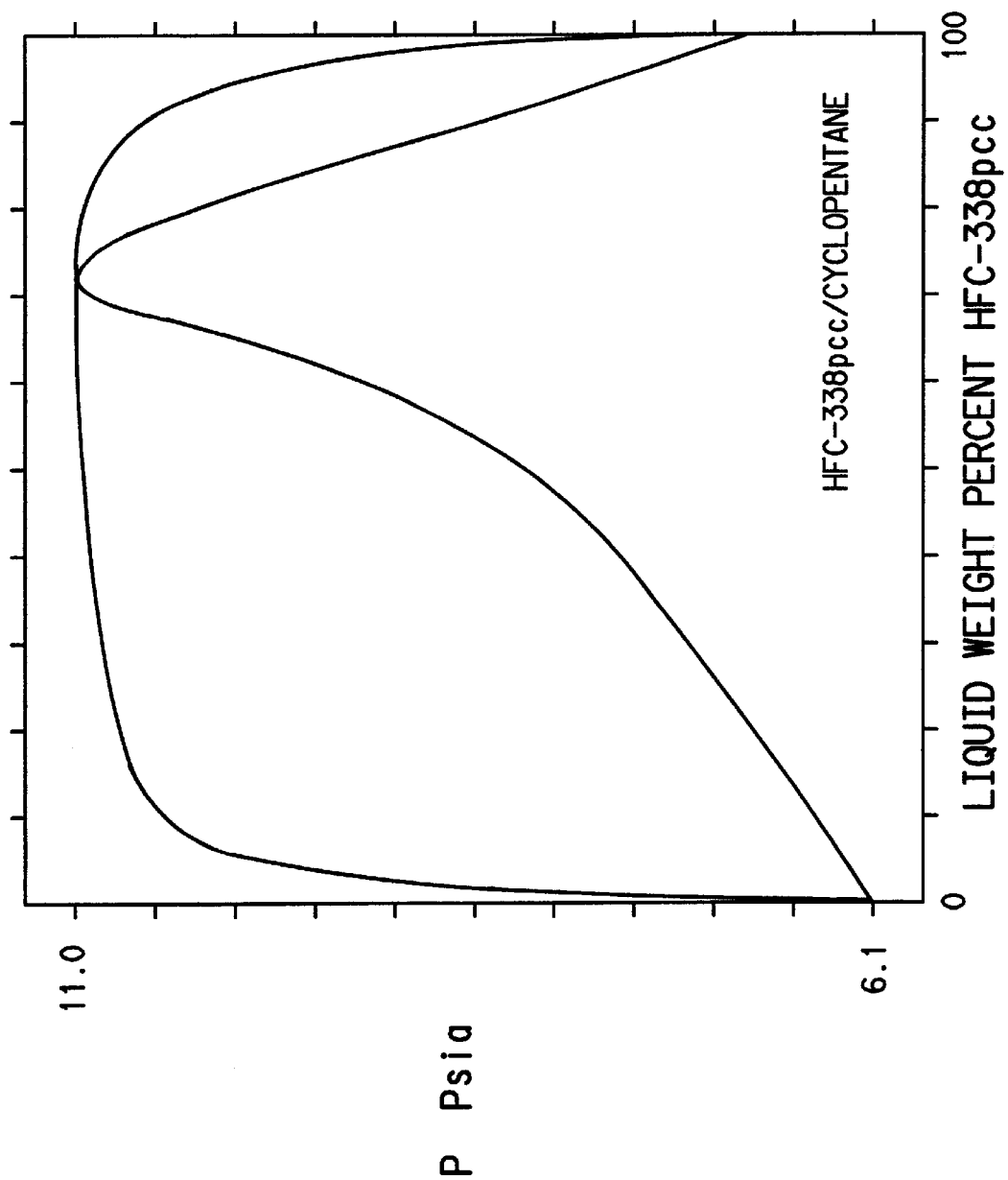
FIG. 5 is a graph of the vapor/liquid equilibrium curve for mixtures of HFC-338pcc and cyclopentane at 25° C.
Figure 6:
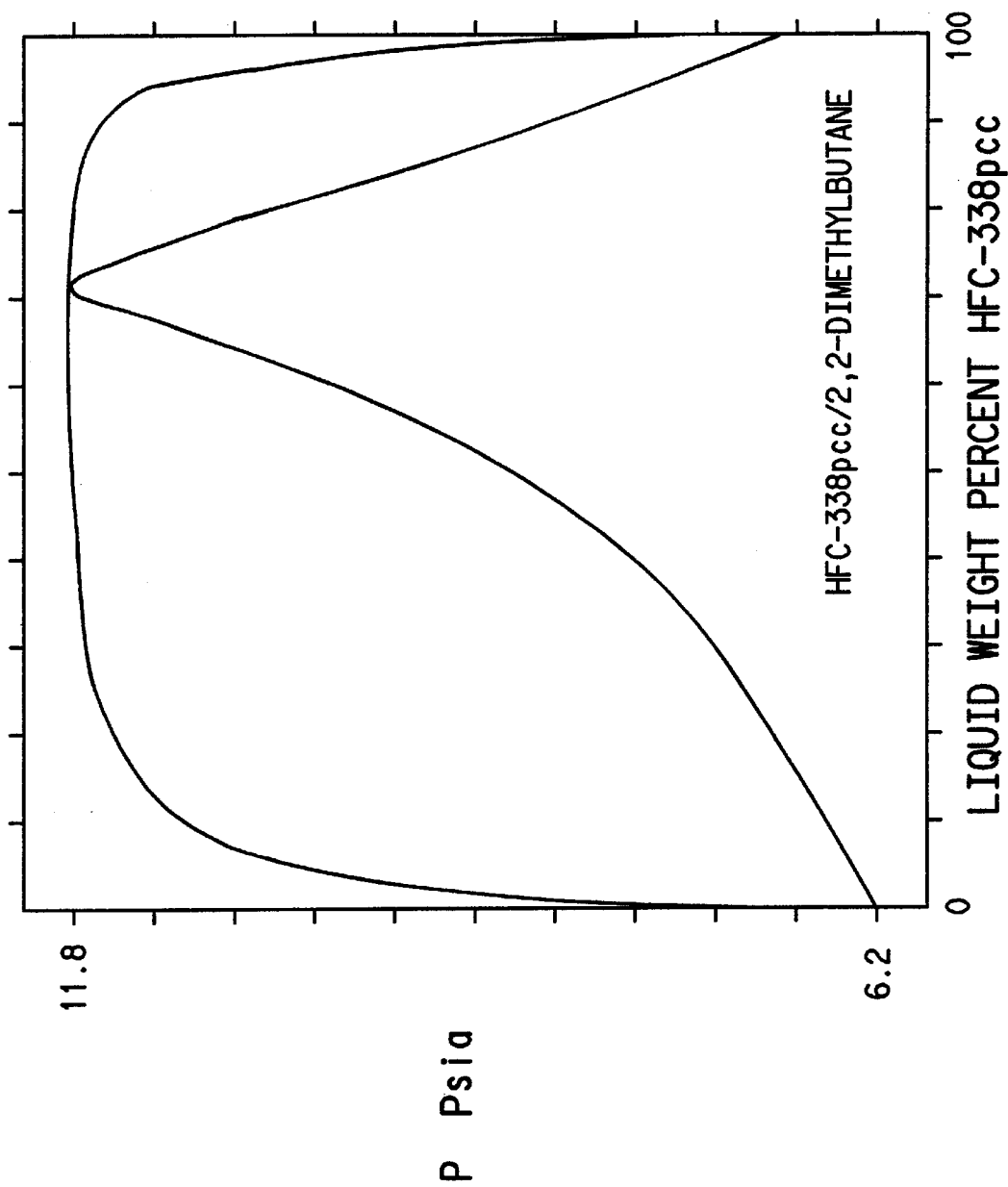
FIG. 6 is a graph of the vapor/liquid equilibrium curve for mixtures of HFC-338pcc and 2,2-dimethylbutane at 25° C.

The present invention relates to compositions of HFC-338pcc and a hydrocarbon having from 3 to 7 carbon atoms. Specific examples include HFC-338pcc and butane, cyclopropane, isobutane, propane, cyclopentane, 2,2-dimethylbutane, n-pentane, 2-methylbutane, cyclohexane, 2,3-dimethylpentane, 3-ethylpentane, heptane, hexane or methylcyclopentane. Also included in this invention are compositions of HFC-338pcc and ethyl formate, propylene oxide, 3110Sβγ, dimethoxyethane or THF.

1–99 wt. % of each of the components of the compositions can be used as refrigerants. Further, the present invention also relates to the discovery of azeotropic or azeotrope-like compositions of effective amounts of each of the above mixtures to form an azeotropic or azeotrope-like composition.

This invention includes the following components: 1,1,2,2,3,3,4,4-octafluorobutane, $CF_2HCF_2CF_2CF_2H$, HFC-338pcc, boiling point=44° C.; butane, $CH_3(CH_2)_2CH_3$, boiling point=0° C.; cyclopropane, $—CH_2CH_2CH_2—$, boiling point=–33° C.; isobutane, $CH_3CH(CH_3)CH_3$, boiling point=–12° C.; propane, $CH_3CH_2CH_3$, boiling point=–42° C.; cyclopentane, $—CH_2CH_2CH_2CH_2CH_2—$, boiling point=49° C.; 2,2-dimethylbutane, $CH_3CH_2C(CH_3)_2CH_3$, boiling point=50° C.; n-pentane, $CH_3(CH_2)_3CH_3$, boiling point=36° C.; 2-methylbutane, $CH_3CH_2CH(CH_3)CH_3$, boiling point=28° C.; ethyl formate, $HCOOC_2H_5$, boiling point=54° C.; propylene oxide, $C_3H_6O$, boiling point=34° C.; bis(pentafluoroethyl)sulfide, 3110Sβγ, $C_2F_5SC_2F_5$, boiling point=37° C.; cyclohexane, $—CH_3CH_2CH_2CH_2CH_3—$, boiling point=80.7° C.; 1,2-dimethoxyethane, $CH_3OCH_2CH_2OCH_3$, boiling point=83° C.; 2,3-dimethylpentane, $CH_3CH(CH_3)CH(CH_3)CH_2CH_3$, boiling point=90° C.; 3-ethylpentane, $CH_3CH_2CH(CH_2CH_3)CH_2CH_3$, boiling point=93° C.; heptane, $CH_3(CH_2)_5CH_3$, boiling point=98.4° C.; hexane, $CH_3(CH_2)_4CH_3$, boiling point=69° C.; methylcyclopentane, $C_6H_{12}$, boiling point=72° C.; and tetrahydrofuran, $C_4H_8O$, boiling point=66° C.

HFC-338pcc may be made by refluxing the potassium salt of perfluoroadipic acid in ethylene glycol as reported by Hudlicky, et. al. in *J. Fluorine Chemistry*, Vol. 59, pp. 9–14 (1992).

3110Sβγ has been prepared by reaction of perfluoroethyl iodide with elemental sulfur at 300° C. under pressure as disclosed by Tiers, Journal of Organic Chemistry, Vol. 26, page 3515 (1961).

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of HFC-338pcc and butane, cyclopropane, isobutane, propane, cyclopentane, 2,2-dimethylbutane, n-pentane, 2-methylbutane, ethyl formate, propylene oxide, 3110Sβγ, cyclohexane, dimethoxyethane, 2,3-dimethylpentane, 3-ethylpentane, heptane, hexane, methylcyclopentane or THF such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| COMPONENTS | PSIA | KPA |
|---|---|---|
| HFC-337pcc | 6.9 | 48 |
| 3110Sβγ | 9.5 | 66 |
| butane | 35.2 | 243 |
| cyclopropane | 105.0 | 724 |
| isobutane | 50.5 | 348 |
| propane | 137.8 | 950 |
| cyclopentane | 6.1 | 42 |
| 2,2-dimethylbutane | 6.2 | 43 |
| n-pentane | 10.3 | 71 |
| 2-methylbutane | 13.3 | 92 |
| ethyl formate | 4.7 | 32 |
| propylene oxide | 10.4 | 72 |
| cyclohexane | 2.2 | 15 |
| dimethoxyethane | 1.7 | 12 |
| 2,3-dimethylpentane | 1.3 | 9 |
| 3-ethylpentane | 1.1 | 8 |
| heptane | 0.9 | 6 |
| hexane | 3.2 | 22 |
| methylcyclopentane | 2.7 | 18 |
| THF | 3.1 | 22 |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt. %) |
|---|---|---|
| HFC-338pcc/butane | 1–70/30–99 | 20–70/30–80 |
| HFC-338pcc/cyclopropane | 1–60/40–99 | 1–60/40–99 |
| HFC-338pcc/isobutane | 1–68/32–99 | 20–68/32–80 |
| HFC-338pcc/propane | 1–64/36–99 | 1–64/36–99 |
| HFC-338pcc/cyclopentane | 47–88/12–53 | 47–88/12–53 |
| HFC-338pcc/2,2-dimethylbutane | 46–86/14–54 | 46–86/14–54 |
| HFC-338pcc/n-pentane | 36–84/16–64 | 36–84/16–64 |
| HFC-338pcc/2-methylbutane | 33–79/21–67 | 33–79/21–67 |
| HFC-338pcc/ethyl formate | 53–99/1–47 | 53–99/1–47 |
| HFC-338pcc/propylene oxide | 1–94/6–99 | 40–94/6–60 |
| HFC-338pcc/3110Sβγ | 1–99/1–99 | 1–90/10–99 |
| HFC-338pcc/cyclohexane | 60–99/1–30 | 80–99/1–20 |
| HFC-338pcc/dimethoxyethane | 85–99/1–15 | 85–99/1–15 |
| HFC-338pcc/2,3-dimethylpentane | 62–99/1–38 | 62–99/1–38 |
| HFC-338pcc/3-ethylpentane | 63–99/1–37 | 63–99/1–37 |
| HFC-338pcc/heptane | 65–99/1–35 | 65–99/1–35 |
| HFC-338pcc/hexane | 56–93/7–44 | 56–93/7–44 |
| HFC-338pcc/methylcyclopentane | 57–99/1–43 | 57–99/1–43 |
| HFC-338pcc/THF | 78–99/1–22 | 78–99/1–22 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following compositions are azeotropic. The temperature is 25° C.

| Composition | Weight Percents | Vapor Press. psia | kPa |
|---|---|---|---|
| HFC-338pcc/butane | 31.0/69.0 | 38.3 | 264 |
| HFC-338pcc/cyclopropane | 6.5/93.5 | 105.5 | 727 |
| HFC-338pcc/isobutane | 22.8/77.2 | 53.0 | 365 |
| HFC-338pcc/propane | 3.1/96.9 | 137.9 | 951 |
| HFC-338pcc/cyclopentane | 72.0/28.0 | 11.0 | 75 |
| HFC-338pcc/2,2-dimethylbutane | 70.5/29.5 | 11.8 | 81 |
| HFC-338pcc/n-pentane | 63.5/36.5 | 13.9 | 96 |
| HFC-338pcc/2-methylbutane | 54.2/45.8 | 18.1 | 124 |
| HFC-338pcc/ethyl formate | 79.3/20.7 | 8.5 | 58 |
| HFC-338pcc/propylene oxide | 55.0/45.0 | 10.6 | 73 |
| HFC-338pcc/3110Sβγ | 15.7/84.3 | 9.7 | 67 |
| HFC-338pcc/cyclohexane | 88.6/11.4 | 7.91 | 55 |
| HFC-338pcc/dimethoxyethane | 96.9/3.1 | 7.31 | 50 |
| HFC-338pcc/2,3-dimethylpentane | 91.7/8.3 | 7.67 | 53 |
| HFC-338pcc/3-ethylpentane | 93.0/7.0 | 7.48 | 52 |
| HFC-338pcc/heptane | 94.7/5.3 | 7.28 | 50 |
| HFC-338pcc/hexane | 82.9/17.1 | 9.03 | 62 |
| HFC-338pcc/methylcyclopentane | 85.7/14.3 | 8.33 | 57 |
| HFC-338pcc/THF | 93.6/6.4 | 7.56 | 52 |

EXAMPLE 2

Impact of Vapor Leakage on Vapor Pressure at 25° C.

A vessel is charged with an initial liquid composition at 25° C. The liquid, and the vapor above the liquid, are allowed to come to equilibrium, and the vapor pressure in the vessel is measured. Vapor is allowed to leak from the vessel, while the temperature is held constant at 25° C., until 50 weight percent of the initial charge is removed, at which time the vapor pressure of the composition remaining in the vessel is measured. The results are summarized below.

| Refrigerant Composition | 0 wt % evaporated psia | kPa | 50 wt % evaporated psia | kPa | 0% change in vapor pressure |
|---|---|---|---|---|---|
| HFC-338pcc/butane | | | | | |
| 31.0/69.0 | 38.3 | 264 | 38.3 | 264 | 0.0 |
| 15/85 | 38.0 | 262 | 36.8 | 254 | 3.2 |
| 10/90 | 37.7 | 260 | 35.8 | 247 | 5.1 |
| 5/95 | 37.0 | 255 | 35.3 | 244 | 4.5 |
| 1/99 | 35.7 | 246 | 35.2 | 243 | 1.4 |
| 50/50 | 38.1 | 263 | 37.9 | 261 | 0.7 |
| 70/30 | 37.5 | 259 | 34.2 | 236 | 9.0 |
| 71/29 | 37.5 | 258 | 33.6 | 232 | 10.3 |
| HFC-338pcc/cyclopropane | | | | | |
| 6.5/93.5 | 105.5 | 727 | 105.5 | 727 | 0.0 |
| 1/99 | 105.2 | 725 | 105.2 | 725 | 0.0 |
| 30/70 | 104.7 | 722 | 103.8 | 716 | 0.8 |
| 50/50 | 103.2 | 711 | 98.7 | 680 | 4.4 |
| 60/40 | 101.5 | 700 | 91.6 | 632 | 9.7 |
| 61/39 | 101.3 | 698 | 90.6 | 625 | 10.5 |
| HFC-338pcc/isobutane | | | | | |
| 22.8/77.2 | 53.0 | 365 | 53.0 | 365 | 0.0 |
| 10/90 | 52.7 | 363 | 51.8 | 357 | 1.6 |
| 1/99 | 51.0 | 351 | 50.5 | 348 | 0.8 |
| 60/40 | 52.3 | 361 | 50.4 | 347 | 3.7 |
| 68/32 | 51.8 | 357 | 46.8 | 323 | 9.7 |
| 69/31 | 51.8 | 357 | 46.0 | 317 | 11.1 |
| HFC-338pcc/propane | | | | | |
| 3.1/96.9 | 137.9 | 951 | 137.9 | 951 | 0.0 |
| 1/99 | 137.9 | 951 | 137.9 | 951 | 0.0 |
| 20/80 | 136.9 | 944 | 136.3 | 940 | 0.5 |
| 60/40 | 132.9 | 916 | 123.7 | 853 | 6.9 |
| 64/36 | 132.0 | 910 | 118.9 | 820 | 9.9 |
| 65/35 | 131.7 | 908 | 117.4 | 810 | 10.9 |
| HFC-338pcc/cyclopentane | | | | | |
| 72.0/28.0 | 11.0 | 75 | 11.0 | 75 | 0.0 |
| 85/15 | 10.8 | 74 | 10.3 | 71 | 4.8 |
| 88/12 | 10.6 | 73 | 9.6 | 66 | 9.4 |
| 89/11 | 10.6 | 73 | 9.4 | 64 | 11.5 |
| 50/50 | 10.9 | 75 | 10.7 | 73 | 1.9 |
| 47/53 | 10.9 | 75 | 10.3 | 71 | 5.4 |
| 46/54 | 10.8 | 75 | 9.7 | 67 | 10.5 |
| HFC-338pcc/2,2-dimethylbutane | | | | | |
| 70.5/29.5 | 11.8 | 81 | 11.8 | 81 | 0.0 |
| 86/14 | 11.7 | 81 | 10.7 | 73 | 8.8 |
| 87/13 | 11.7 | 80 | 10.2 | 70 | 12.5 |
| 50/50 | 11.8 | 81 | 11.5 | 79 | 2.1 |
| 46/54 | 11.8 | 81 | 10.8 | 74 | 8.4 |
| 45/55 | 11.8 | 81 | 10.2 | 71 | 12.9 |
| HFC-338pcc/n-pentane | | | | | |
| 63.5/36.5 | 13.9 | 96 | 13.9 | 96 | 0.0 |
| 80/20 | 13.7 | 94 | 13.2 | 91 | 3.6 |
| 84/16 | 13.6 | 94 | 12.3 | 85 | 9.6 |
| 85/15 | 13.6 | 94 | 11.8 | 81 | 13.2 |
| 40/60 | 13.6 | 94 | 12.7 | 88 | 6.6 |
| 36/64 | 13.5 | 93 | 12.2 | 84 | 9.6 |
| 35/65 | 13.5 | 93 | 12.1 | 83 | 10.4 |
| HFC-338pcc/2-methylbutane | | | | | |
| 54.2/45.8 | 18.1 | 124 | 18.1 | 124 | 0.0 |
| 33/67 | 18.0 | 124 | 16.6 | 114 | 7.9 |
| 32/68 | 18.0 | 124 | 16.0 | 111 | 10.8 |
| 80/20 | 17.8 | 123 | 15.6 | 107 | 12.5 |
| 79/21 | 17.8 | 123 | 16.0 | 111 | 10.0 |
| HFC-338pcc/ethyl formate | | | | | |
| 79.3/20.7 | 8.5 | 58 | 8.5 | 58 | 0.0 |
| 90/10 | 8.3 | 57 | 8.1 | 56 | 2.4 |
| 99/1 | 7.2 | 49 | 7.0 | 48 | 2.5 |
| 60/40 | 8.3 | 57 | 8.0 | 55 | 3.7 |
| 53/47 | 8.2 | 56 | 7.5 | 51 | 8.9 |
| 52/48 | 8.2 | 56 | 7.4 | 51 | 10.0 |
| HFC-338pcc/propylene oxide | | | | | |
| 55.0/45.0 | 10.60 | 73 | 10.60 | 73 | 0.0 |
| 40/60 | 10.57 | 73 | 10.57 | 73 | 0.0 |
| 20/80 | 10.50 | 72 | 10.50 | 72 | 0.0 |
| 1/99 | 10.43 | 72 | 10.43 | 72 | 0.0 |
| 80/20 | 10.37 | 71 | 10.29 | 71 | 0.7 |
| 94/6 | 9.59 | 66 | 8.77 | 60 | 8.6 |
| 95/5 | 9.47 | 65 | 8.25 | 57 | 12.9 |
| HFC-338pcc/3110Sβγ | | | | | |
| 15.7/84.3 | 9.7 | 67 | 9.7 | 67 | 0.0 |
| 1/99 | 9.5 | 66 | 9.5 | 66 | 0.0 |
| 40/60 | 9.4 | 65 | 9.3 | 64 | 1.1 |

-continued

| Refrigerant Composition | 0 wt % evaporated psia | kPa | 50 wt % evaporated psia | kPa | 0% change in vapor pressure |
|---|---|---|---|---|---|
| 60/40 | 8.9 | 62 | 8.6 | 59 | 3.7 |
| 80/20 | 8.1 | 56 | 7.7 | 53 | 6.0 |
| 90/10 | 7.6 | 52 | 7.2 | 50 | 5.0 |
| 99/1 | 7.0 | 48 | 6.9 | 48 | 0.7 |
| HFC-338pcc/cyclohexane | | | | | |
| 88.6/11.4 | 7.91 | 55 | 7.91 | 55 | 0.0 |
| 99/1 | 7.24 | 50 | 6.97 | 48 | 3.7 |
| 70/30 | 7.80 | 54 | 7.69 | 53 | 1.4 |
| 60/40 | 7.75 | 53 | 7.31 | 50 | 5.7 |
| 59/41 | 7.74 | 53 | 6.84 | 47 | 11.6 |
| HFC-338pcc/dimethoxyethane | | | | | |
| 96.9/3.1 | 7.31 | 50 | 7.31 | 50 | 0.0 |
| 99/1 | 7.29 | 50 | 6.88 | 47 | 5.6 |
| 85/15 | 7.01 | 48 | 6.35 | 44 | 9.4 |
| 84/16 | 6.97 | 48 | 6.21 | 43 | 10.9 |
| HFC-338pcc/2,3-dimethyl-pentane | | | | | |
| 91.7/8.3 | 7.67 | 53 | 7.67 | 53 | 0.00 |
| 99/1 | 7.30 | 50 | 6.93 | 48 | 5.1 |
| 80/20 | 7.63 | 53 | 7.60 | 52 | 0.4 |
| 70/30 | 7.61 | 52 | 7.53 | 52 | 1.1 |
| 62/38 | 7.59 | 52 | 6.90 | 48 | 9.1 |
| 61/39 | 7.59 | 52 | 6.41 | 44 | 15.5 |
| HFC-338pcc/3-ethylpentane | | | | | |
| 93.0/7.0 | 7.48 | 52 | 7.48 | 52 | 0.0 |
| 99/1 | 7.22 | 50 | 6.94 | 48 | 3.9 |
| 80/20 | 7.44 | 51 | 7.40 | 51 | 0.5 |
| 70/30 | 7.41 | 51 | 7.32 | 50 | 1.2 |
| 63/37 | 7.40 | 51 | 6.67 | 46 | 9.9 |
| 62/38 | 7.40 | 51 | 61.3 | 42 | 17.2 |
| HFC-338pcc/heptane | | | | | |
| 94.7/5.3 | 7.28 | 50 | 7.28 | 50 | 0.0 |
| 99/1 | 7.12 | 49 | 6.97 | 48 | 2.1 |
| 80/20 | 7.22 | 50 | 7.17 | 49 | 0.7 |
| 70/30 | 7.19 | 50 | 7.07 | 49 | 1.7 |
| 65/35 | 7.18 | 50 | 6.65 | 46 | 7.4 |
| 64/36 | 7.18 | 50 | 6.32 | 44 | 12.0 |
| HFC-338pcc/hexane | | | | | |
| 82.9/17.1 | 9.03 | 62 | 9.03 | 62 | 0.0 |
| 93/7 | 8.89 | 61 | 8.10 | 56 | 8.9 |
| 94/6 | 8.83 | 61 | 7.76 | 54 | 12.1 |
| 60/40 | 8.97 | 62 | 8.76 | 60 | 2.3 |
| 56/44 | 8.96 | 62 | 8.09 | 56 | 9.7 |
| 55/45 | 8.96 | 62 | 7.51 | 52 | 16.2 |
| HFC-338pcc/methylcyclo-pentane | | | | | |
| 85.7/14.3 | 8.33 | 57 | 8.33 | 57 | 0.0 |
| 95/5 | 8.10 | 56 | 7.59 | 52 | 6.3 |
| 99/1 | 7.34 | 51 | 6.95 | 48 | 5.3 |
| 57/43 | 8.20 | 57 | 7.57 | 52 | 7.7 |
| 56/44 | 8.19 | 56 | 6.51 | 45 | 20.5 |
| HFC-338pcc/THF | | | | | |
| 93.6/6.4 | 7.56 | 52 | 7.56 | 52 | 0.0 |
| 99/1 | 7.27 | 50 | 6.99 | 48 | 3.9 |
| 78/22 | 7.18 | 50 | 6.53 | 45 | 9.1 |
| 77/23 | 7.14 | 49 | 6.42 | 44 | 10.1 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 0° C.

A leak test is performed on compositions of HFC-338pcc and THF, at the temperature of 0° C. The results are summarized below.

| Refrigerant Composition | 0 wt % evaporated psia | kPa | 50 wt % evaporated psia | kPa | 0% change in vapor pressure |
|---|---|---|---|---|---|
| HFC-338pcc/THF | | | | | |
| 94.3/5.7 | 2.40 | 16.5 | 2.40 | 16.5 | 0.0 |
| 99/1 | 2.33 | 16.1 | 2.23 | 15.4 | 4.3 |
| 80/20 | 2.29 | 15.8 | 2.08 | 14.3 | 9.2 |
| 79/21 | 2.28 | 15.7 | 2.05 | 14.1 | 10.1 |

These results show that compositions of and are azeotropic or azeotrope-like at different temperatures, but that the weight percents of the components vary as the temperature is changed.

EXAMPLE 4

Refrigerant Performance

The following table shows the performance of various refrigerants in an ideal vapor compression cycle. The data are based on the following conditions.

Evaporator temperature 40.0° F. (4.4° C.)

Condenser temperature 130.0° F. (54.4° C.)

Liquid subcooled 5° F. (2.8° C.)

Return Gas 60° F. (15.6° C.)

Compressor efficiency is 70%.

The refrigeration capacity is based on a compressor with a fixed displacement of 3.5 cubic feet per minute and 70% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. | | Cond Press. | | Comp. Dis. Temp. | | COP | Capacity BTU/min | kw |
|---|---|---|---|---|---|---|---|---|---|
| | Psia | kPa | Psia | kPa | °F. | °C. | | | |
| HFC-338pcc/butane | | | | | | | | | |
| 1/99 | 17.6 | 121 | 80.4 | 554 | 161.6 | 72.0 | 2.99 | 76.2 | 1.3 |
| 99/1 | 3.2 | 22 | 22.3 | 154 | 143.9 | 62.2 | 3.00 | 18.0 | 0.3 |
| HFC-338pcc/cyclopropane | | | | | | | | | |
| 1/99 | 57.1 | 294 | 214.4 | 1478 | 211.2 | 99.6 | 3.03 | 226.0 | 4.0 |
| 99/1* | 4.6 | 32 | 27.2 | 188 | 144.7 | 62.6 | 3.56 | 27.6 | 0.5 |
| HFC-338pcc/isobutane | | | | | | | | | |
| 1/99 | 26.1 | 180 | 109.7 | 756 | 158.0 | 70.0 | 2.87 | 101.6 | 1.8 |
| 99/1 | 3.3 | 23 | 22.6 | 156 | 143.5 | 61.9 | 3.03 | 18.5 | 0.3 |
| HFC-338pcc/propane | | | | | | | | | |
| 1/99 | 75.8 | 523 | 269.8 | 1860 | 172.1 | 77.8 | 2.63 | 235.2 | 4.1 |
| 99/1* | 4.3 | 30 | 26.2 | 181 | 145.4 | 63.0 | 3.42 | 25.2 | 0.4 |
| HFC-338pcc/cyclopentane | | | | | | | | | |
| 1/99 | 2.6 | 18 | 17.2 | 119 | 159.3 | 70.7 | 3.16 | 15.2 | 0.3 |
| 99/1 | 3.1 | 21 | 21.3 | 147 | 143.9 | 62.2 | 2.94 | 16.7 | 0.3 |
| HFC-338pcc/2,2-dimethylbutane | | | | | | | | | |
| 1/99 | 2.7 | 19 | 16.8 | 116 | 137.7 | 58.7 | 2.94 | 13.9 | 0.2 |
| 99/1 | 3.0 | 21 | 20.9 | 144 | 143.6 | 62.0 | 2.92 | 16.3 | 0.3 |
| HFC-338pcc/n-pentane | | | | | | | | | |
| 1/99 | 4.4 | 30 | 26.6 | 183 | 155.7 | 68.7 | 3.08 | 23.6 | 0.4 |
| 99/1 | 3.2 | 22 | 22.1 | 152 | 143.3 | 61.8 | 2.99 | 17.8 | 0.3 |
| HFC-338pcc/2-methylbutane | | | | | | | | | |
| 1/99 | 6.0 | 41 | 33.2 | 229 | 148.2 | 64.6 | 3.00 | 29.5 | 0.5 |
| 99/1 | 3.0 | 21 | 21.3 | 147 | 143.9 | 62.2 | 2.93 | 16.7 | 0.3 |
| HFC-338pcc/ethyl formate | | | | | | | | | |
| 1/99 | 1.9 | 13 | 15.3 | 105 | 202.3 | 94.6 | 3.62 | 14.7 | 0.3 |
| 99/1 | 3.1 | 21 | 21.8 | 150 | 144.3 | 62.4 | 2.97 | 17.3 | 0.3 |
| HFC-338pcc/propylene oxide | | | | | | | | | |
| 1/99 | 4.5 | 31 | 28.1 | 194 | 199.0 | 92.8 | 3.31 | 27.5 | 0.5 |
| 99/1 | 3.3 | 23 | 22.3 | 154 | 144.1 | 62.3 | 3.01 | 18.1 | 0.3 |
| HFC-338pcc/3110Sβγ | | | | | | | | | |
| 1/99* | 3.9 | 27 | 26.7 | 184 | 132.8 | 56.0 | 2.61 | 18.5 | 0.3 |
| 99/1 | 3.0 | 21 | 21.0 | 145 | 143.7 | 62.1 | 2.92 | 16.3 | 0.3 |
| HFC-338pcc/cyclohexane | | | | | | | | | |
| 60/40 | 1.5 | 10 | 12.7 | 88 | 151.2 | 66.2 | 3.19 | 10.1 | 0.2 |
| 99/1 | 3.0 | 21 | 20.8 | 143 | 213.7 | 100.9 | 3.23 | 14.3 | 0.3 |
| HFC-338pcc/dimethoxyethane | | | | | | | | | |
| 60/40 | 1.4 | 10 | 12.9 | 89 | 164.0 | 73.3 | 3.28 | 9.9 | 0.2 |
| 99/1 | 3.0 | 21 | 20.9 | 144 | 144.0 | 62.2 | 2.93 | 16.3 | 0.3 |
| HFC-338pcc/2,3-dimethylpentane | | | | | | | | | |
| 60/40 | 0.7 | 5 | 7.0 | 48 | 147.2 | 64.0 | 3.21 | 5.2 | 0.1 |
| 99/1 | 2.5 | 17 | 19.0 | 131 | 147.4 | 64.1 | 2.91 | 14.1 | 0.2 |
| HFC-338pcc/3-ethylpentane | | | | | | | | | |
| 60/40 | 0.9 | 6 | 8.9 | 61 | 146.8 | 63.8 | 3.25 | 6.7 | 0.1 |
| 99/1 | 2.8 | 19 | 20.2 | 139 | 144.4 | 62.4 | 2.92 | 15.6 | 0.3 |
| HFC-338pcc/heptane | | | | | | | | | |
| 60/40 | 0.8 | 6 | 8.1 | 56 | 148.5 | 64.7 | 3.31 | 6.1 | 0.1 |
| 99/1 | 2.8 | 19 | 20.1 | 139 | 144.7 | 62.6 | 2.93 | 15.4 | 0.3 |
| HFC-338pcc/hexane | | | | | | | | | |
| 1/99 | 1.1 | 8 | 9.1 | 63 | 147.6 | 64.2 | 3.21 | 7.3 | 0.1 |
| 99/1 | 2.9 | 20 | 20.7 | 143 | 143.8 | 62.1 | 2.93 | 16.1 | 0.3 |
| HFC-338pcc/methylcyclopentane | | | | | | | | | |
| 1/99 | 1.1 | 8 | 8.4 | 58 | 151.4 | 66.3 | 3.13 | 6.7 | 0.1 |
| 99/1 | 3.0 | 21 | 20.8 | 143 | 145.7 | 63.2 | 2.95 | 16.3 | 0.3 |

| Refrig. | Evap. Press. | | Cond Press. | | Comp. Dis. Temp. | | COP | Capacity BTU/min | |
|---|---|---|---|---|---|---|---|---|---|
| Comp. | Psia | kPa | Psia | kPa | °F. | °C. | COP | kw | |
| HFC-338pcc/THF | | | | | | | | | |
| 60/40 | 2.5 | 17 | 19.6 | 135 | 165.4 | 74.1 | 3.16 | 16.0 | 0.3 |
| 99/1 | 3.1 | 21 | 21.4 | 148 | 144.1 | 62.3 | 2.94 | 16.8 | 0.3 |

*65° C. Return Gas

EXAMPLE 5

This Example is directed to measurements of the liquid/vapor equilibrium curves for the mixtures in FIGS. 1–6 and 8–19.

Turning to FIG. 1, the upper curve represents the composition of the liquid, and the lower curve represents the composition of the vapor.

The data for the compositions of the liquid in FIG. 1 are obtained as follows. A stainless steel cylinder is evacuated, and a weighed amount of HFC-338pcc is added to the cylinder. The cylinder is cooled to reduce the vapor pressure of HFC-338pcc, and then a weighed amount of butane is added to the cylinder. The cylinder is agitated to mix the HFC-338pcc and butane, and then the cylinder is placed in a constant temperature bath until the temperature comes to equilibrium at 25° C., at which time the vapor pressure of the HFC-338pcc and butane in the cylinder is measured. Additional samples of liquid are measured the same way, and the results are plotted in FIG. 1.

The curve which shows the composition of the vapor is calculated using an ideal gas equation of state.

Vapor/liquid equilibrium data are obtained in the same way for the mixtures shown in FIGS. 2–6 and 8–19.

The data in FIGS. 1–6 and 8–19 show that at 25° C., there are ranges of compositions that have vapor pressures higher than the vapor pressures of the pure components of the composition at that same temperature. As stated earlier, the higher than expected pressures of these compositions may result in an unexpected increase in the refrigeration capacity or efficiency for these compositions versus the pure components of the compositions.

EXAMPLE 6

Figure 7:
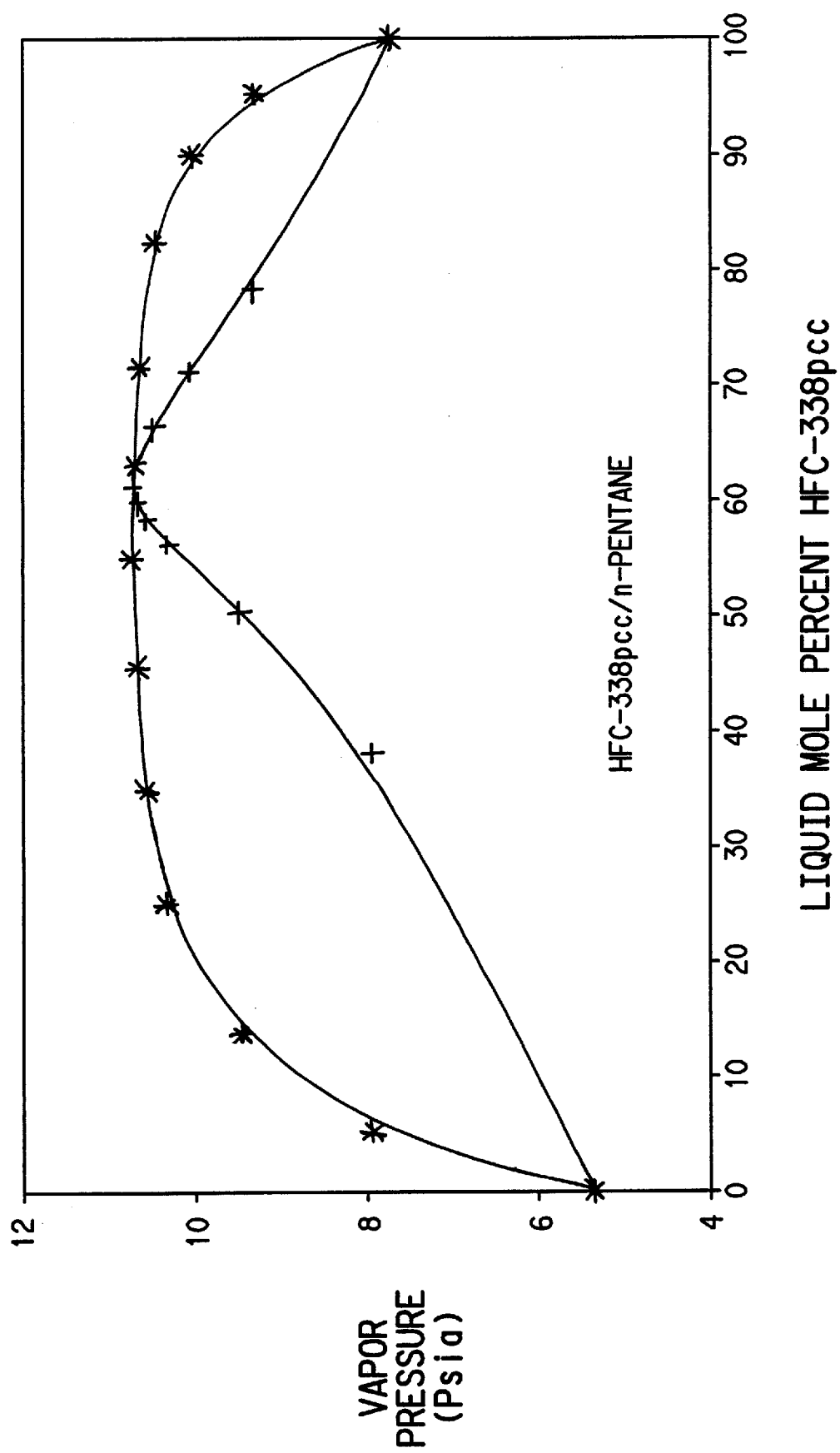
FIG. 7 is a graph of the vapor/liquid equilibrium curve for mixtures of HFC-338pcc and n-pentane at 18.33° C.
Figure 8:
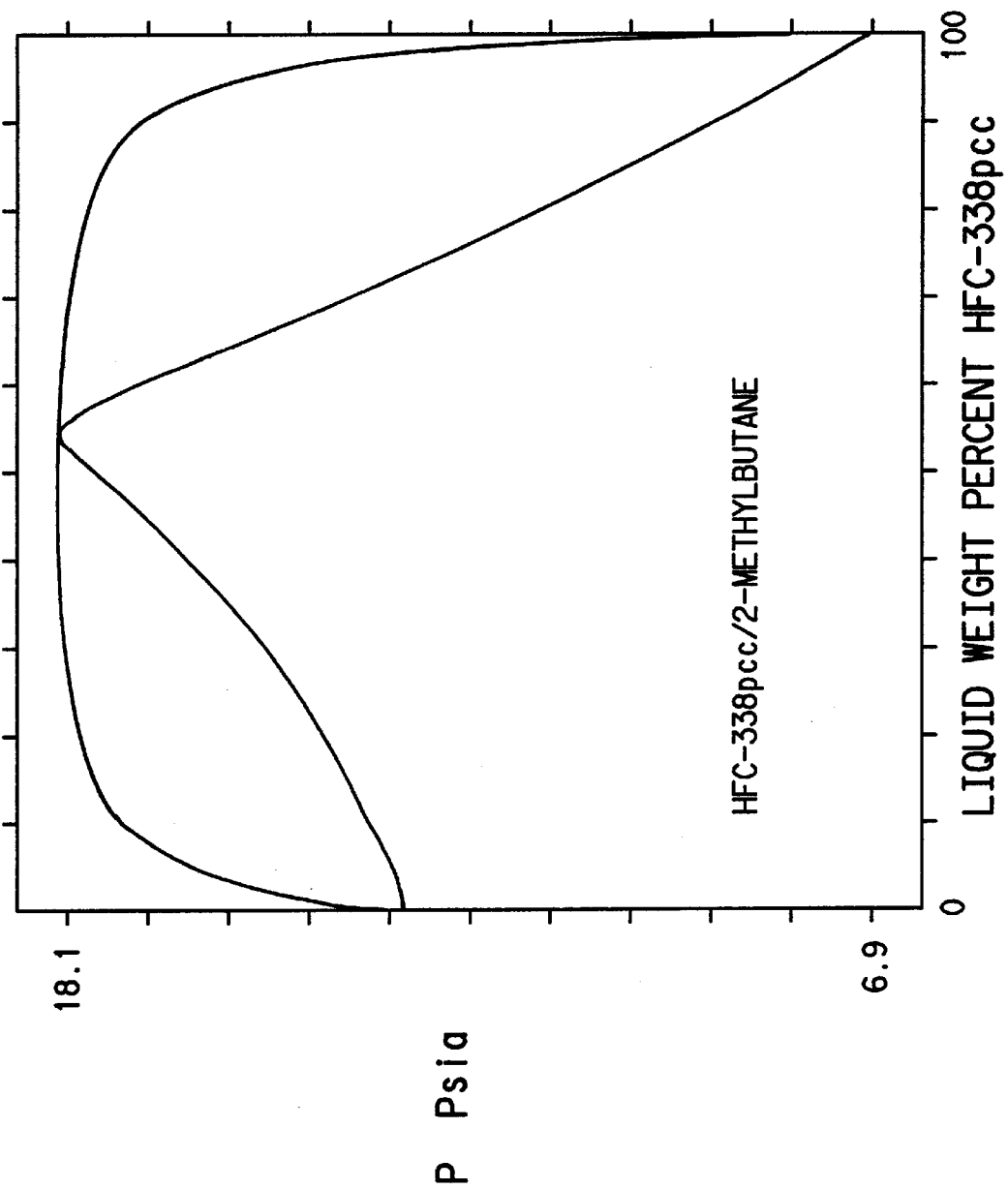
FIG. 8 is a graph of the vapor/liquid equilibrium curve for mixtures of HFC-338pcc and 2-methylbutane at 25° C.
Figure 9:
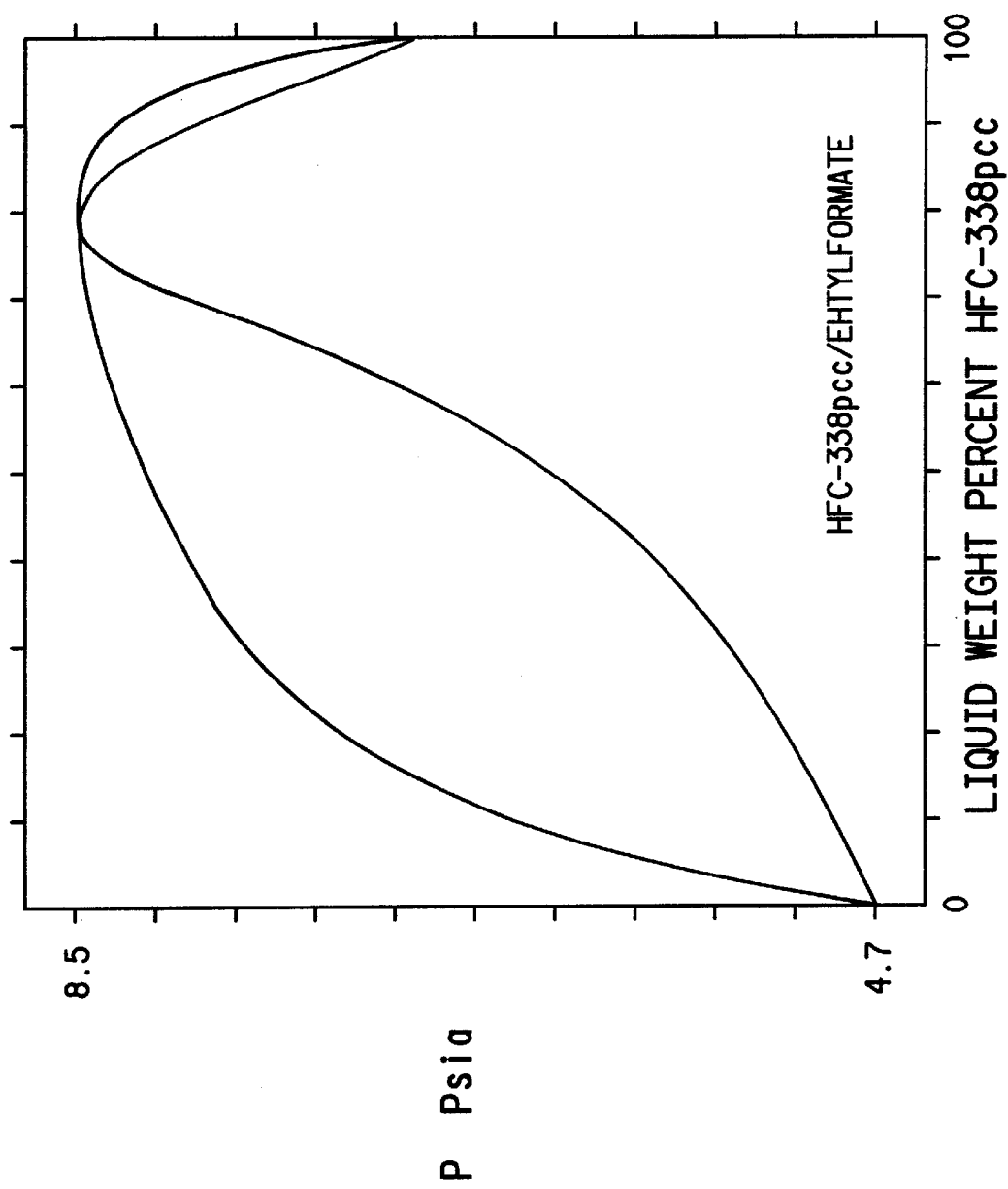
FIG. 9 is a graph of the vapor/liquid equilibrium curve for mixtures of HFC-338pcc and ethylformate at 25° C.
Figure 10:
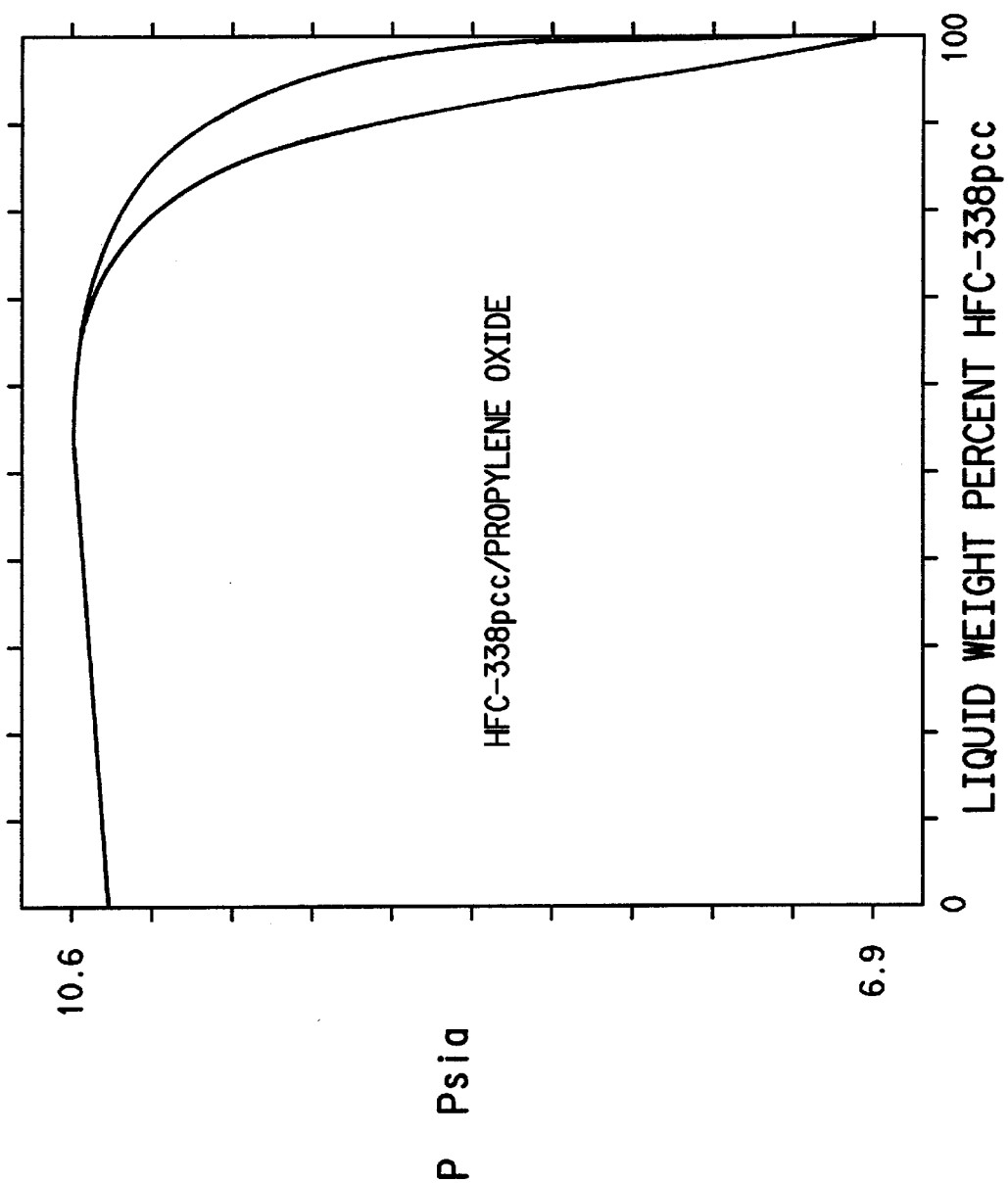
FIG. 10 is a graph of the vapor/liquid equilibrium curve for mixtures of HFC-338pcc and propylene oxide at 25° C.
Figure 11:
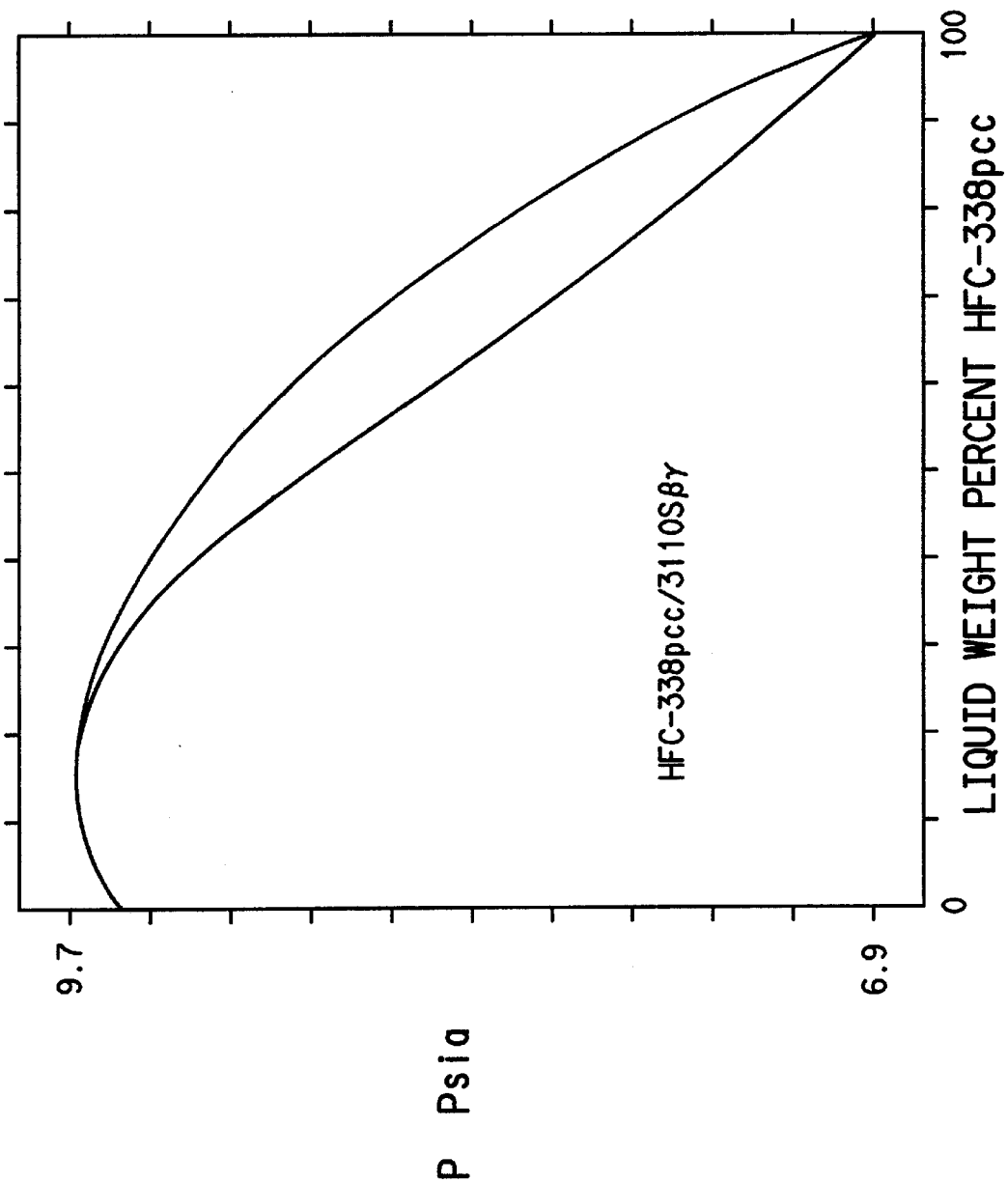
FIG. 11 is a graph of the vapor/liquid equilibrium curve for mixtures of HFC-338pcc and 3110S$\beta\gamma$ at 25° C.
Figure 12:
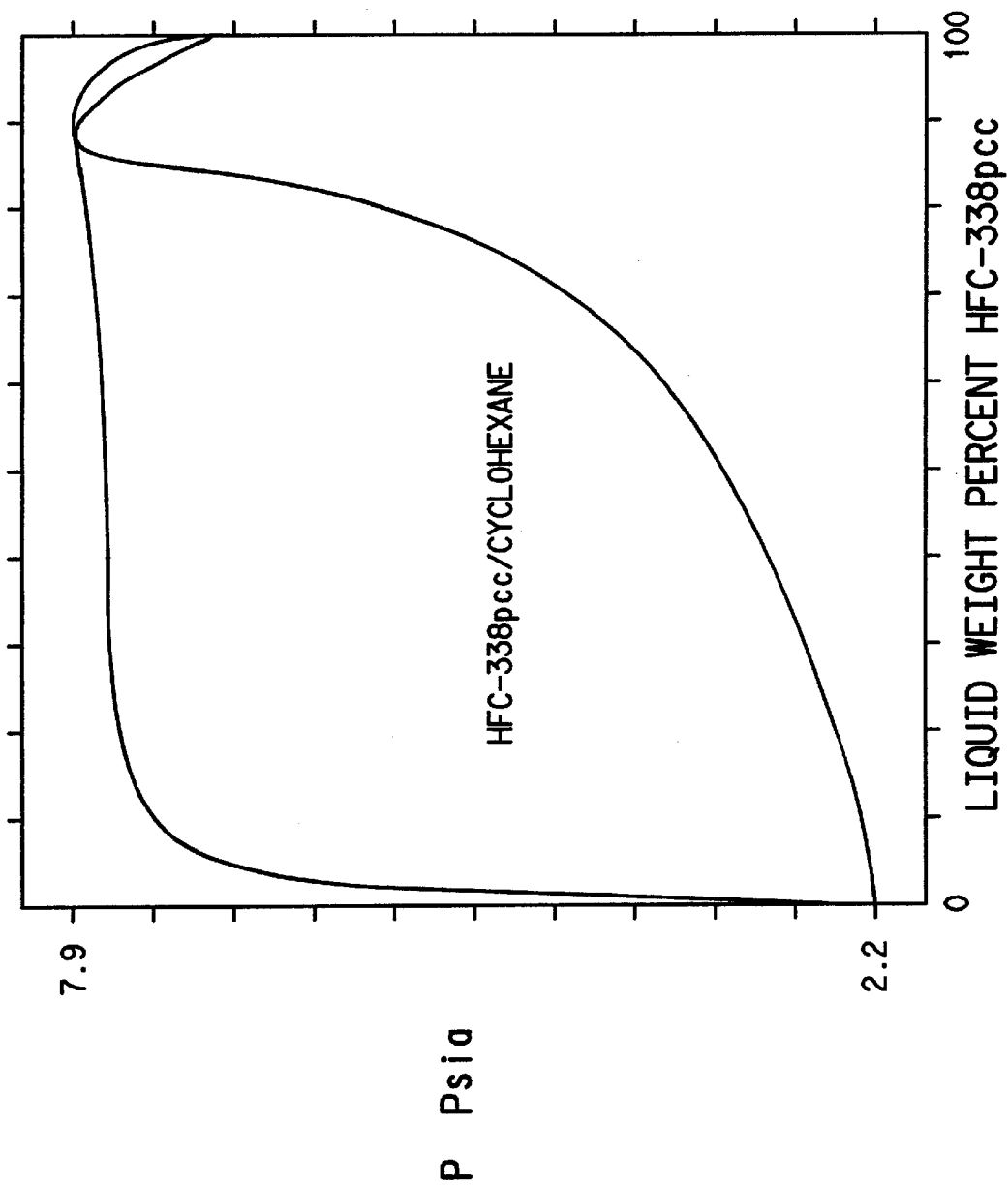
FIG. 12 is a graph of the vapor/liquid equilibrium curve for mixtures of HFC-338pcc and cyclohexane at 25° C.
Figure 13:
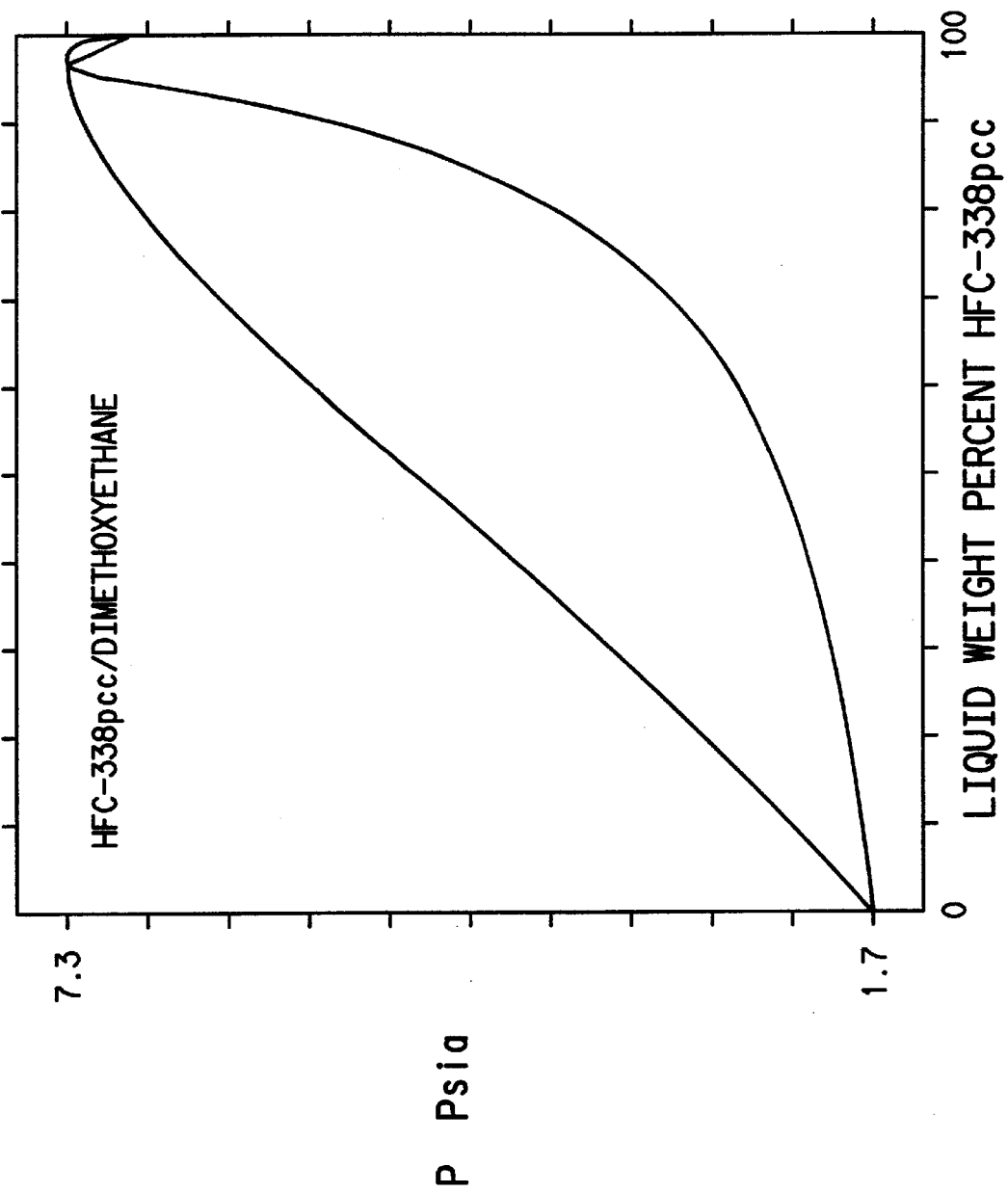
FIG. 13 is a graph of the vapor/liquid equilibrium curve for mixtures of HFC-338pcc and dimethoxyethane at 25° C.
Figure 14:
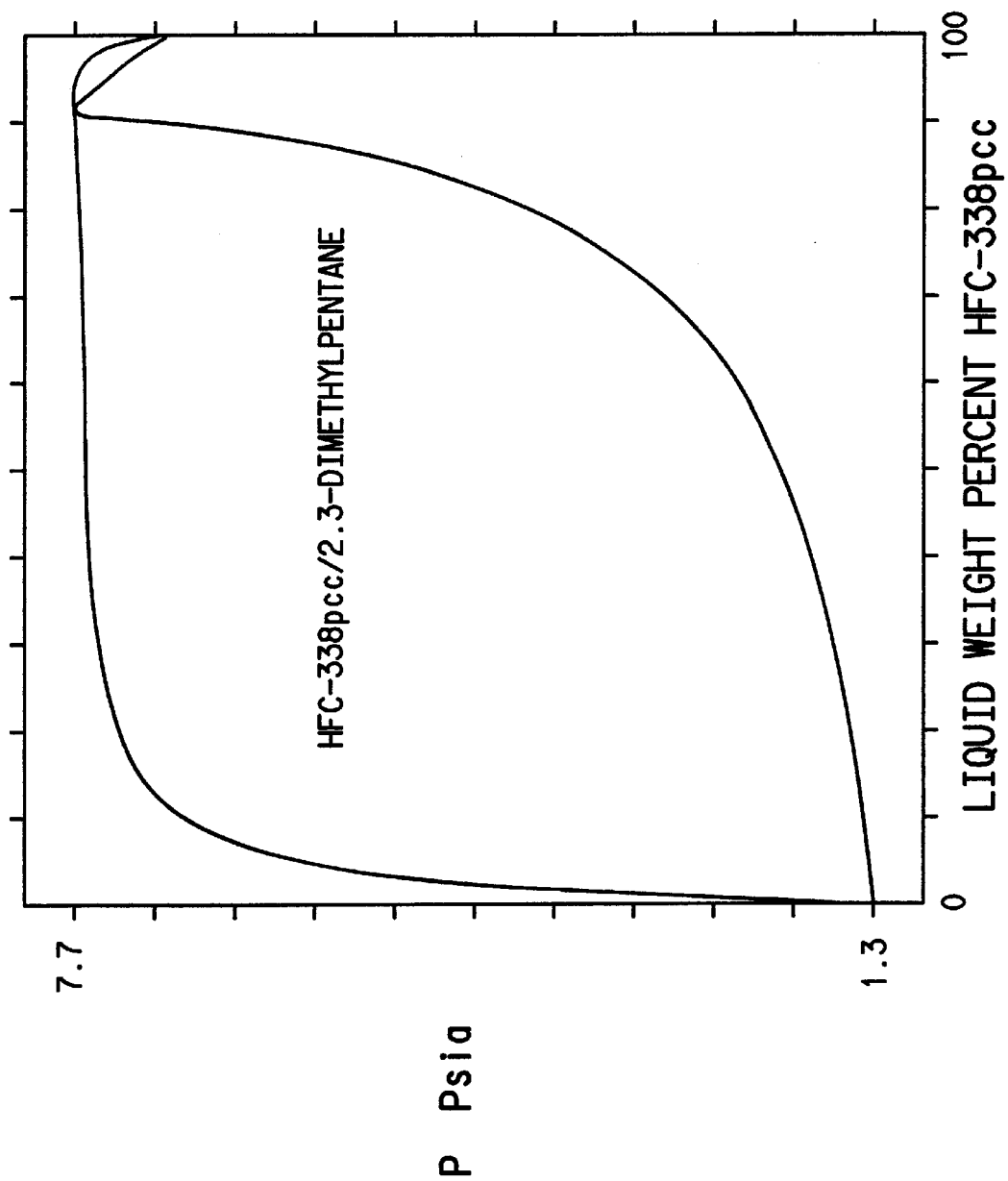
FIG. 14 is a graph of the vapor/liquid equilibrium curve for mixtures of HFC-338pcc and 2,3-dimethylpentane at 25° C.
Figure 15:
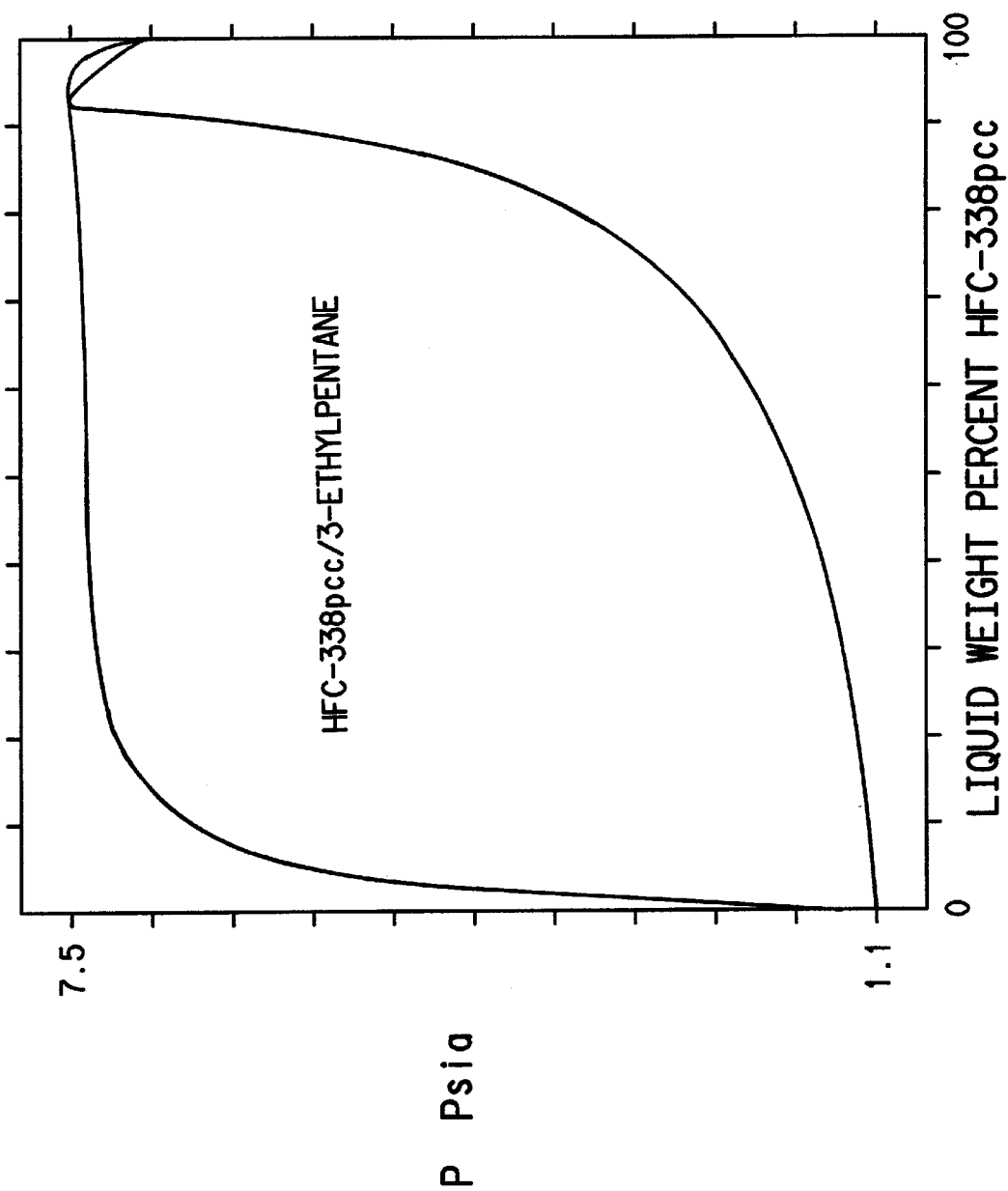
FIG. 15 is a graph of the vapor/liquid equilibrium curve for mixtures of HFC-338pcc and 3-ethylpentane at 25° C.
Figure 16:
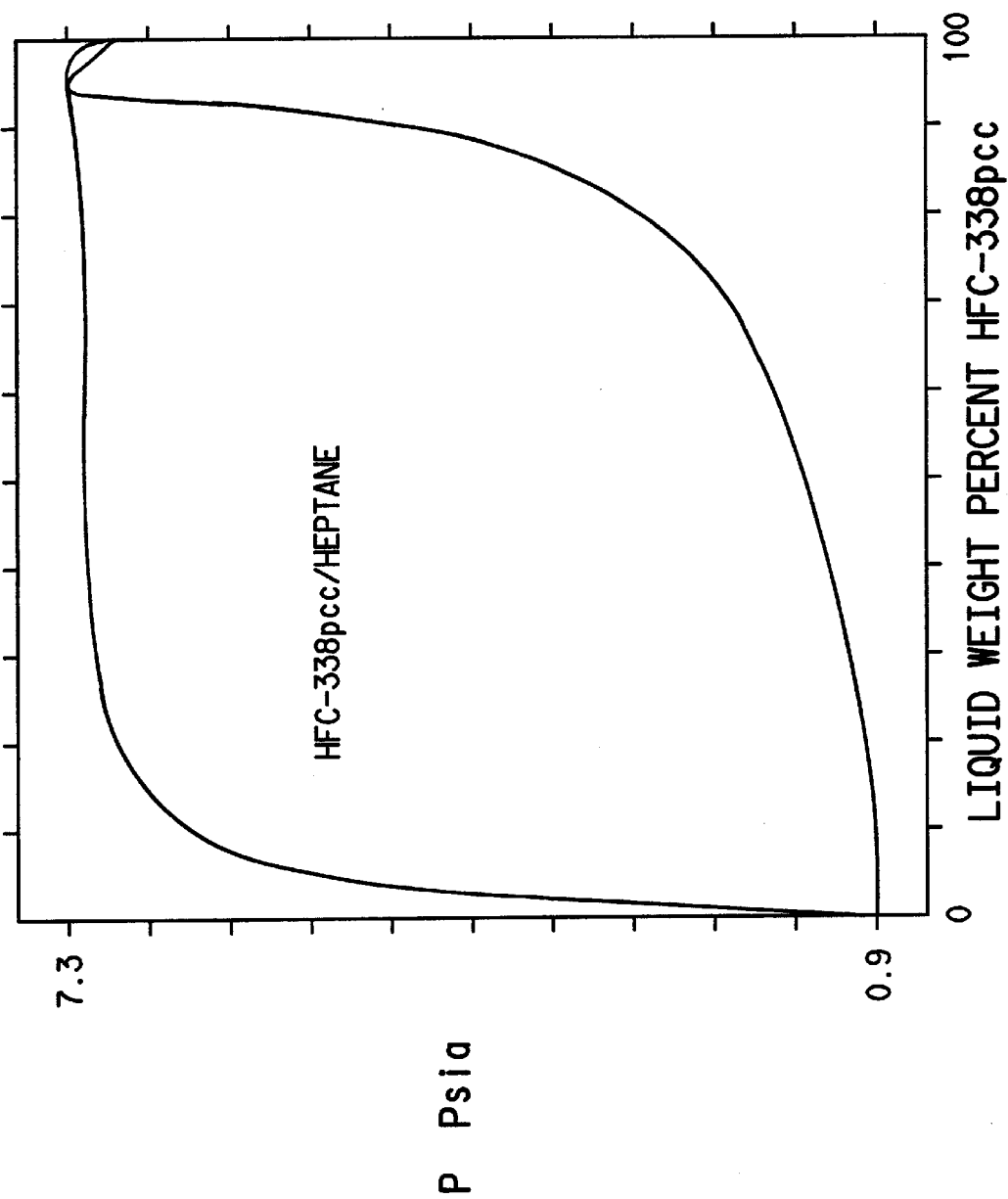
FIG. 16 is a graph of the vapor/liquid equilibrium curve for mixtures of HFC-338pcc and heptane at 25° C.
Figure 17:
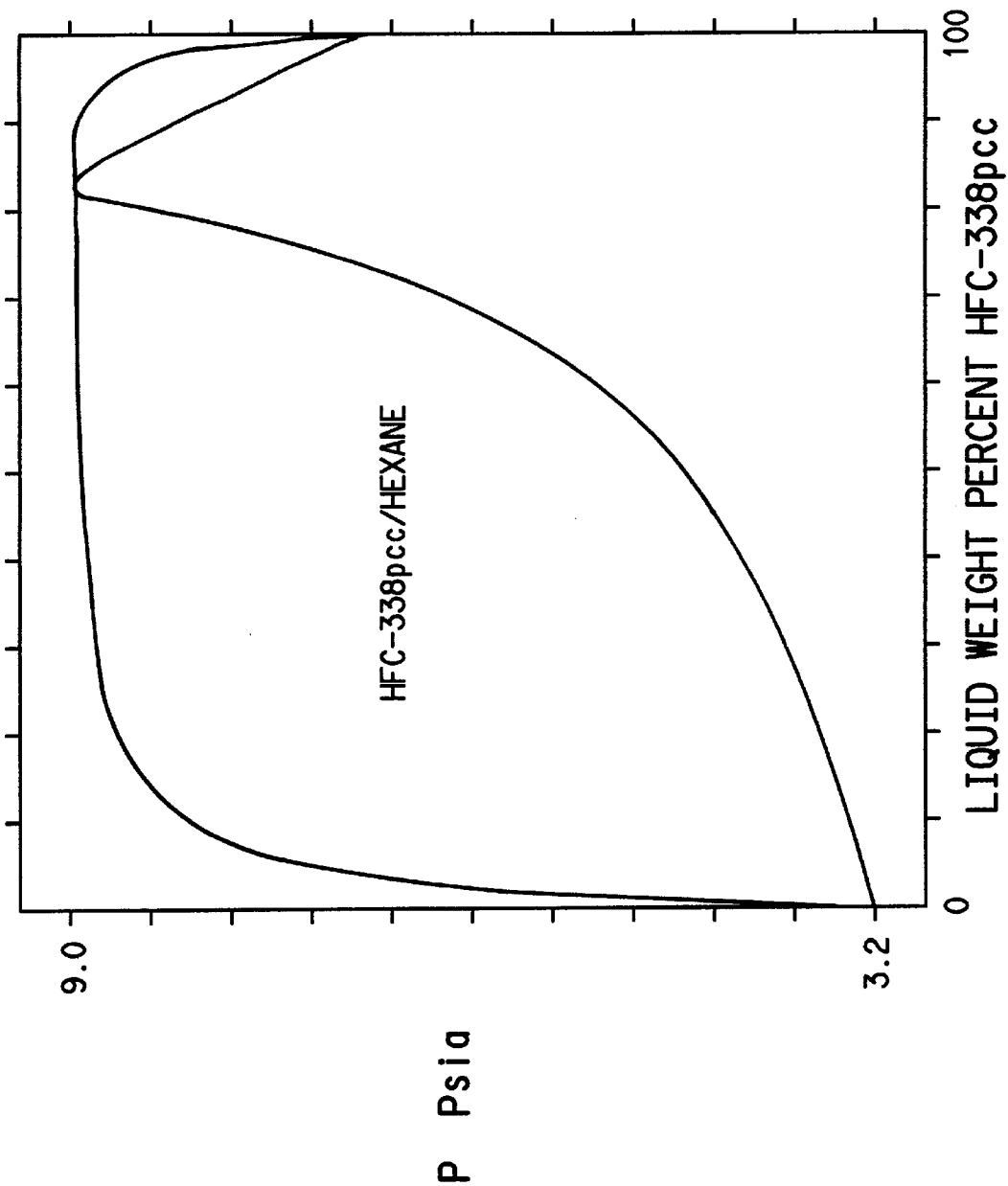
FIG. 17 is a graph of the vapor/liquid equilibrium curve for mixtures of HFC-338pcc and hexane at 25° C.
Figure 18:
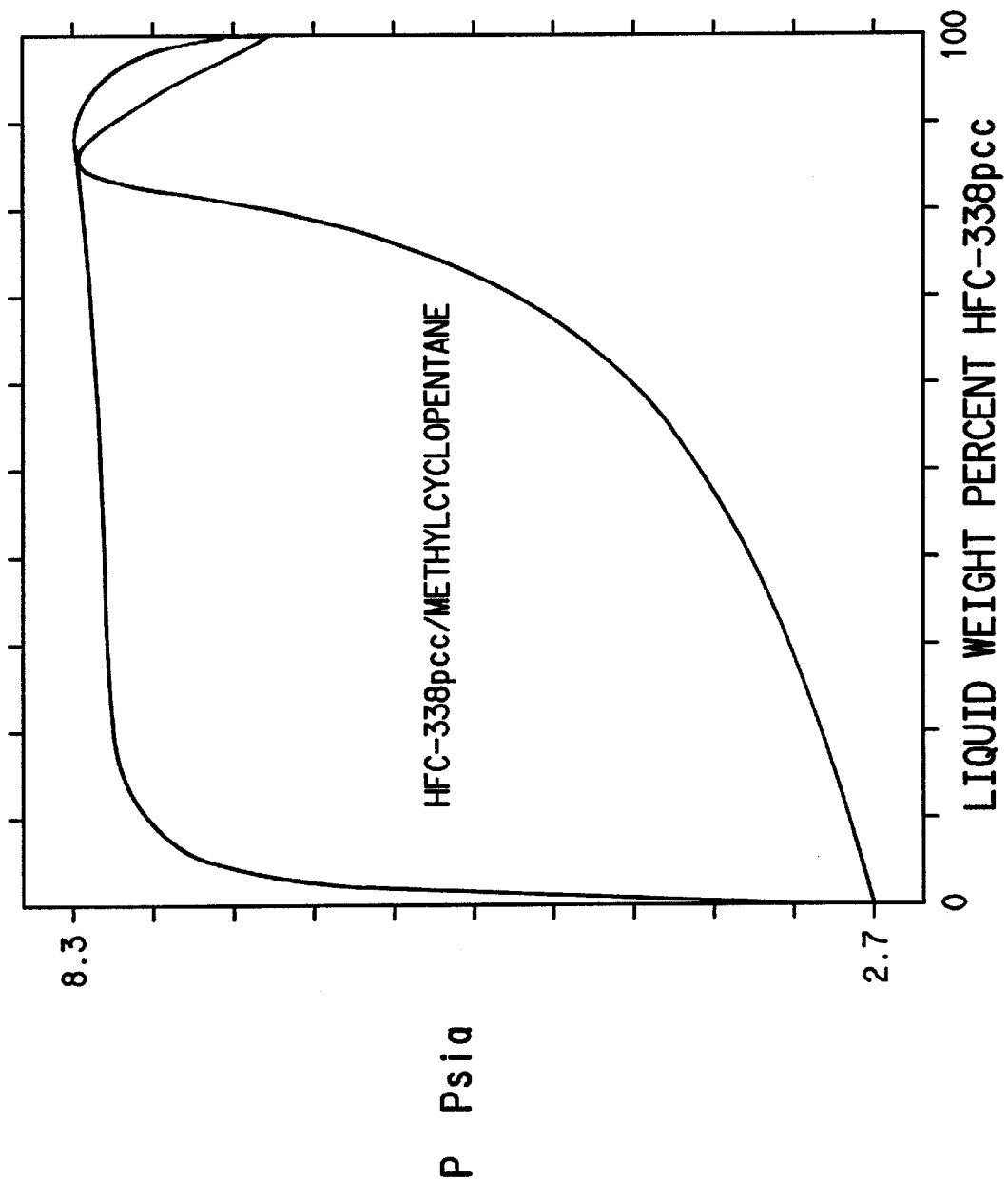
FIG. 18 is a graph of the vapor/liquid equilibrium curve for mixtures of HFC-338pcc and methylcyclopentane at 25° C.

This Example is directed to measurements of the liquid/vapor equilibrium curve for mixtures of HFC-338pcc and n-pentane. The liquid/vapor equilibrium data for these mixtures are shown in FIG. 7. The upper curve represents the liquid composition, and the lower curve represents the vapor composition.

The procedure for measuring the composition of the liquid for mixtures of HFC-338pcc and n-pentane in FIG. 7 was as follows. A stainless steel cylinder was evacuated, and a weighed amount of HFC-338pcc was added to the cylinder. The cylinder was cooled to reduce the vapor pressure of HFC-338pcc, and then a weighed amount of n-pentane was added to the cylinder. The cylinder was agitated to mix the HFC-338pcc and n-pentane, and then the cylinder was placed in a constant temperature bath until the temperature came to equilibrium at 18.33° C., at which time the vapor pressure of the content of the cylinder was measured. Samples of the liquid in the cylinder were taken and analyzed, and the results are plotted in FIG. 7 as asterisks, with a best fit curve having been drawn through the asterisks.

This procedure was repeated for various mixtures of HFC-338pcc and n-pentane as indicated in FIG. 7.

The curve which shows the composition of the vapor is calculated using an ideal gas equation of state.

The data in FIG. 7 show that at 18.33° C., there are ranges of compositions that have vapor pressures higher than the vapor pressures of the pure components of the composition at that same temperature.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The compositions of the present inventions are useful as blowing agents in the production of thermoset foams, which include polyurethane and phenolic foams, and thermoplastic foams, which include polystyrene or polyolefin foams.

A polyurethane foam may be made by combining a composition of the present invention, which functions as a blowing agent, together with an isocyanate, a polyol, and appropriate catalysts or surfactants to form a poylurethane or polyisocyanurate reaction formulation. Water may be added to the formulation raction to modify the foam polymer as well as to generate carbon dioxide as an in-situ blowing agent.

A phenolic foam may be produced by combining a phenolic resin or resole, acid catalysts, a blowing agent of the present invention and appropriate surfactants to form a phenolic reaction formulation. The formulation may be chosen such that either an open cell or closed cell phenolic foam is produced.

Polystyrene or polyolefin foams may be made by extruing a molten mixure of a polymer, such as polystyrere, polyethylene or polypropylene), a nucleating agent and a blowing agent of the present invention through an extrusion die that yields the desired foam product profile.

The novel compositions of this invention, including the azeotropic or azeotrope-like compositions, may be used as cleaning agents to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. This is conventionally done by suspending a circuit board to be cleaned in a boiling sump which contains the azeotropic or azeotrope-like composition, then suspending the circuit board in a rinse sump, which contains the same azeotropic or azeotrope-like composition, and finally, for one minute in the solvent vapor above the boiling sump.

As a further example, the azeotropic mixtures of this invention can be used in cleaning processes such as described in U.S. Pat. No. 3,881,949, or as a buffing abrasive detergent.

It is desirable that the cleaning agents be azeotropic or azeotrope-like so that they do not tend to fractionate upon boiling or evaporation. This behavior is desirable because if the cleaning agent were not azeotropic or azeotrope-like, the more volatile components of the cleaning agent would preferentially evaporate, and would result in a cleaning agent with a changed composition that may become flammable and that may have less-desirable solvency properties, such as lower rosin flux solvency and lower inertness toward the electrical components being cleaned. The azeotropic character is also desirable in vapor degreasing operations because the cleaning agent is generally redistilled and employed for final rinse cleaning.

The novel compositions of this invention are also useful as fire extinguishing agents.

In addition to these applications, the novel constant boiling or substantially constant boiling compositions of the invention are also useful as aerosol propellants, heat transfer media, gaseous dielectrics, and power cycle working fluids.

ADDITIONAL COMPOUNDS

Other components, such as aliphatic hydrocarbons having a boiling point of −60° to +60° C., hydrofluorocarbonalkanes having a boiling point of −60° to +60° C., hydrofluoropropanes having a boiling point of between −60° to +60° C., hydrocarbon esters having a boiling point between −60° to +60° C., hydrochlorofluorocarbons having a boiling point between −60° to +60° C., hydrofluorocarbons having a boiling point of −60° to +60° C., hydrochlorocarbons having a boiling point between −60° to +60° C., chlorocarbons and perfluorinated compounds, can be added to the azeotropic or azeotrope-like compositions described above.

Additives such as lubricants, corrosion inhibitors, surfactants, stabilizers, dyes and other appropriate materials may be added to the novel compositions of the invention for a variety of purposes provides they do not have an adverse influence on the composition for its intended application. Preferred lubricants include esters having a molecular weight greater than 250.

We claim:

1. An azeotropic or azeotrope-like binary composition consisting essentially of 53–99 weight percent 1,1,2,2,3,3,4,4-octafluorobutane and 1–47 weight percent ethyl formate, wherein when the temperature has been adjusted to about 25° C., the vapor pressure of the composition is higher than the vapor pressure of the individual components and the vapor pressure of the 1,1,2,2,3,3,4,4-octafluorobutane/ethyl formate is about 7.2–8.5 psia, and the change in vapor pressure of the composition is less than about 10 percent after 50 percent has been allowed to evaporate.

2. A process for producing refrigeration, comprising condensing a composition of claim 1, in the vicinity of the body to be cooled.

* * * * *